US011986841B2

(12) United States Patent
Johns et al.

(10) Patent No.: US 11,986,841 B2
(45) Date of Patent: May 21, 2024

(54) CENTRIFUGE ROTOR AND CONTAINER ARRANGEMENT

(71) Applicant: Beckman Coulter, Inc., Brea, CA (US)

(72) Inventors: Charles W. Johns, Brownsburg, IN (US); Stephen L. Otts, Brownsburg, IN (US)

(73) Assignee: Beckman Coulter, Inc., Brea, CA (US)

( * ) Notice: Subject to any disclaimer, the term of this patent is extended or adjusted under 35 U.S.C. 154(b) by 826 days.

(21) Appl. No.: 17/053,719

(22) PCT Filed: May 10, 2019

(86) PCT No.: PCT/US2019/031830
§ 371 (c)(1),
(2) Date: Nov. 6, 2020

(87) PCT Pub. No.: WO2019/217895
PCT Pub. Date: Nov. 14, 2019

(65) Prior Publication Data

US 2021/0245173 A1 Aug. 12, 2021

Related U.S. Application Data

(60) Provisional application No. 62/670,383, filed on May 11, 2018.

(51) Int. Cl.
*B04B 5/04* (2006.01)
*B04B 7/08* (2006.01)

(52) U.S. Cl.
CPC .............. *B04B 5/0414* (2013.01); *B04B 7/08* (2013.01); *B04B 2005/0435* (2013.01)

(58) Field of Classification Search
CPC . B04B 5/0414; B04B 7/08; B04B 2005/0435; B04B 5/0407
See application file for complete search history.

(56) References Cited

U.S. PATENT DOCUMENTS 4,427,406 A 1/1984 Nielsen
4,941,867 A 7/1990 Tominaga
(Continued)

FOREIGN PATENT DOCUMENTS

CN 201235314 Y 5/2009
CN 102665922 A 9/2012
(Continued)

OTHER PUBLICATIONS

International Search Report and Written Opinion for PCT/US2019/031830, dated Aug. 9, 2019.

*Primary Examiner* — Walter D. Griffin
*Assistant Examiner* — Shuyi S. Liu
(74) *Attorney, Agent, or Firm* — Merchant & Gould P.C.

(57) ABSTRACT

A centrifuge rotor includes a rotor body having a base, a sidewall, and a top. The top defines an opening that provides access to an annulus cavity inside the rotor body. A cover is removably attachable to the rotor body to seal the annulus cavity. A drive hub extends from a portion of the base of the rotor body and couples to a drive shaft of a centrifuge motor. The rotor body is sized to receive one or more sample containers in the annulus cavity, and to constrain the one or more sample containers inside the annulus cavity between the base, the sidewall, and the top when the one or more containers are advanced radially against the sidewall.

17 Claims, 35 Drawing Sheets

(56) References Cited

U.S. PATENT DOCUMENTS

| | | | | |
|---|---|---|---|---|
| 5,665,047 | A | 9/1997 | Brimhall | |
| 2008/0234121 | A1 | 9/2008 | Kim et al. | |
| 2011/0319247 | A1 * | 12/2011 | Kitazawa | B04B 5/0414 422/548 |

FOREIGN PATENT DOCUMENTS

| | | | | |
|---|---|---|---|---|
| CN | 106573255 | A | 4/2017 | |
| DE | 3443021 | A1 | 9/1985 | |
| DE | 10017565 | A1 | 10/2001 | |
| DE | 10065283 | A1 | 7/2002 | |
| EP | 0029318 | A1 | 5/1981 | |
| EP | 0882512 | A2 * | 12/1998 | B04B 7/08 |
| EP | 0882512 | A2 | 12/1998 | |
| EP | 1351772 | B1 * | 6/2006 | B04B 5/0428 |
| FR | 993500 | A | 10/1951 | |
| GB | 1605218 | A * | 8/1984 | B04B 5/0414 |
| JP | 5-76797 | A | 3/1993 | |
| JP | 2003-080115 | A | 3/2003 | |
| JP | 3951602 | B2 * | 8/2007 | B04B 2005/0435 |

* cited by examiner

CENTRIFUGE ROTOR AND CONTAINER ARRANGEMENT

CROSS-REFERENCE TO RELATED APPLICATIONS

This application is a U.S. National Stage application of PCT/US2019/031830, filed on 10 May 2019, which claims the benefit of priority to U.S. Provisional Patent Application No. 62/670,383, filed on May 11, 2018, the disclosures of which are hereby incorporated by reference in their entireties. To the extent appropriate, a claim of priority is made to each of the above-disclosed applications.

BACKGROUND

A centrifuge is an apparatus commonly used to separate particles in a sample for isolation or analysis of the particles. In a conventional centrifuge, sample tubes or bottles are loaded in a rotor, and the rotor is mounted inside an enclosed chamber of the centrifuge. The rotor is connected to a drive of a motor of the centrifuge that spins the rotor at a desired rotational speed inside the enclosed chamber.

In some cases, it may be desirable to process various volumes (e.g., 2 L up to 15 L) of samples such as cell cultures, algae, etc. Larger centrifuges may be developed to accommodate larger rotor sizes for centrifugation of larger sample sizes. However, larger centrifuges require more floor space which is limited in a laboratory.

Continuous flow rotors may be used for loading a large sample inside a centrifuge. However, in a continuous flow rotor, the whole annulus of the rotor is filled with the sample. Thus, the rotor must be disassembled and cleaned each time a new sample is loaded into the centrifuge. Also, only one sample can be loaded at a time.

Swinging bucket rotors and fixed angle rotors may be used for loading large sample sizes inside a centrifuge. However, these types of rotors provide undesirably low radial accelerations and high K-factors. The K-factor of a rotor represents the relative pelleting efficiency of the rotor at maximum rotation speed and can be used to estimate the time required for sedimentation of a sample spun by the rotor.

Additional difficulties include the loading and unloading of sample containers into and out of the centrifuge rotor, and strengthening the containers to withstand hydrostatic pressures generated at radial accelerations in excess of 15,000× G.

Thus, improvements are needed to allow efficient loading of large sample sizes in existing compact centrifuges without having to disassemble and clean a rotor each time a new sample is loaded, while also improving the radial acceleration and the relative pelleting efficiency (e.g., K-factor) of the rotor.

SUMMARY

In general terms, this disclosure is directed to a centrifuge. In some embodiments, and by non-limiting example, the centrifuge includes a centrifuge rotor and corresponding sample containers housed inside the rotor.

In one possible configuration and by further non-limiting example, the rotor and containers are shaped for maximizing the volume of samples that can be loaded inside a centrifuge, while improving the radial acceleration and the relative pelleting efficiency (e.g., K-factor) of the rotor. Various aspects are described in this disclosure, which include, but are not limited to, the following aspects.

In one aspect, the disclosed technology relates to a centrifuge rotor comprising: a rotor body having a base, a sidewall, and a top. The top defines an opening that provides access to an annulus cavity inside the rotor body. A drive hub extends from a portion of the base of the rotor body and is configured to couple to a drive shaft of a centrifuge motor. The rotor body is configured to receive a first container in the annulus cavity, and to constrain the first container inside the annulus cavity between the base, the sidewall, and the top when the first container is advanced radially against the sidewall.

In some examples, the annulus cavity defines an annulus cavity radius between the sidewall and a central axis of the rotor body and an opening radius between a peripheral edge of the opening and the central axis, and the opening radius is in a range from 40% to 70% of the annulus cavity radius. In some examples, the annulus cavity defines an annulus cavity radius between the sidewall and a central axis of the rotor body in a range from 8 inches to 10 inches, and an opening radius between a peripheral edge of the opening and the central axis in a range of 4 inches to 6 inches.

In some examples, the annulus cavity is shaped to constrain the first container and a second container, and the first container and second container are of different types. In some examples, the annulus cavity is shaped to constrain an adapter between the first container and the second container. In some examples, a plurality of first containers and a plurality of second containers are shaped and positioned to form an annulus within the annulus cavity. In some examples, a plurality of first containers, second containers, and adapters are shaped and positioned to form an annulus within the annulus cavity. In some examples, the annulus cavity is shaped for storing one or more sample containers each having a volume in a range from 1 L to 2 L.

In some examples, the centrifuge rotor further comprises a cover removably attachable to the rotor body to seal the annulus cavity. In some examples, the centrifuge rotor further comprises a tie-down bolt that removably attaches the cover and the rotor body to the drive shaft of the centrifuge motor.

In another aspect, the disclosed technology relates to a centrifuge rotor comprising: a rotor body, including a sidewall; an annulus cavity inside the rotor body; and a first container constrained inside the annulus cavity. The first container having a wedge shape and being constrained by at least the sidewall. In some examples the centrifuge rotor further comprises a cover for sealing the annulus cavity.

In some examples, the centrifuge rotor further comprising a second container constrained inside the annulus cavity, the second container having a substantially rectangular shape and being constrained by at least the sidewall. In some examples, the centrifuge rotor further comprises a third container constrained inside the annulus cavity, the third container having a lopsided wedge shape and being constrained by at least the sidewall. In some examples, the centrifuge rotor further comprises a third container constrained inside the annulus cavity having a wedge angle, the first container having a wedge angle, and the wedge angle of the third container is greater than the wedge angle of the first container. In some examples, the centrifuge rotor further comprises at least two third containers constrained inside the annulus cavity, wherein the second container is positioned between the third containers. In some examples, the centrifuge rotor further comprises an adapter constrained inside the annulus cavity between the first container and the second container, the adapter having a wedge shape.

In some examples, the first container has a first surface adjacent to the sidewall, and a second surface facing a central axis of the rotor body, and the width of the first surface being larger than the width of the second surface. In some examples, the first container has a first surface adjacent to the sidewall, and a second surface facing a central axis of the rotor body, and the second surface is substantially flat. In some examples, the first container has side surfaces that are not parallel with one another, and a curved surface corresponding to a curved shape of the sidewall.

In some examples, the first container comprises a core for holding a sample, and a cap for sealing the core. In some examples, the first container comprises a lid that slides over the cap for preventing the cap from opening.

In another aspect, the disclosed technology relates to a method of loading a centrifuge rotor, comprising: loading wedge shaped sample containers inside an annulus cavity; loading wedge shaped adapters inside the annulus cavity; and loading a key container having parallel side surfaces inside the annulus cavity after loading the wedge shaped sample containers and wedge shaped adapters.

In some examples, the method further comprises filling the wedge shaped sample containers with an equal sample volume. In some examples, the method further comprises filling the key container and the wedge shaped sample containers with samples containing particles for separation. In some examples, the method further comprises attaching a removable cover for sealing the annulus cavity, and mounting the centrifuge rotor inside a centrifuge.

In another aspect, the disclosed technology relates to a centrifuge rotor comprising: a rotor body, including a sidewall; an annulus cavity inside the rotor body; a plurality of containers constrained inside the annulus cavity, the plurality of containers having a substantially rectangular shape and being constrained by at least the sidewall.

In some examples, the centrifuge rotor further comprises a plurality of adapters constrained inside the annulus cavity between the plurality of containers, the plurality of adapters having a wedge shape. In some examples, the plurality of adapters are in a strip. In some examples, the plurality of adapters are connected.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description.

DETAILED DESCRIPTION

Figure 1:
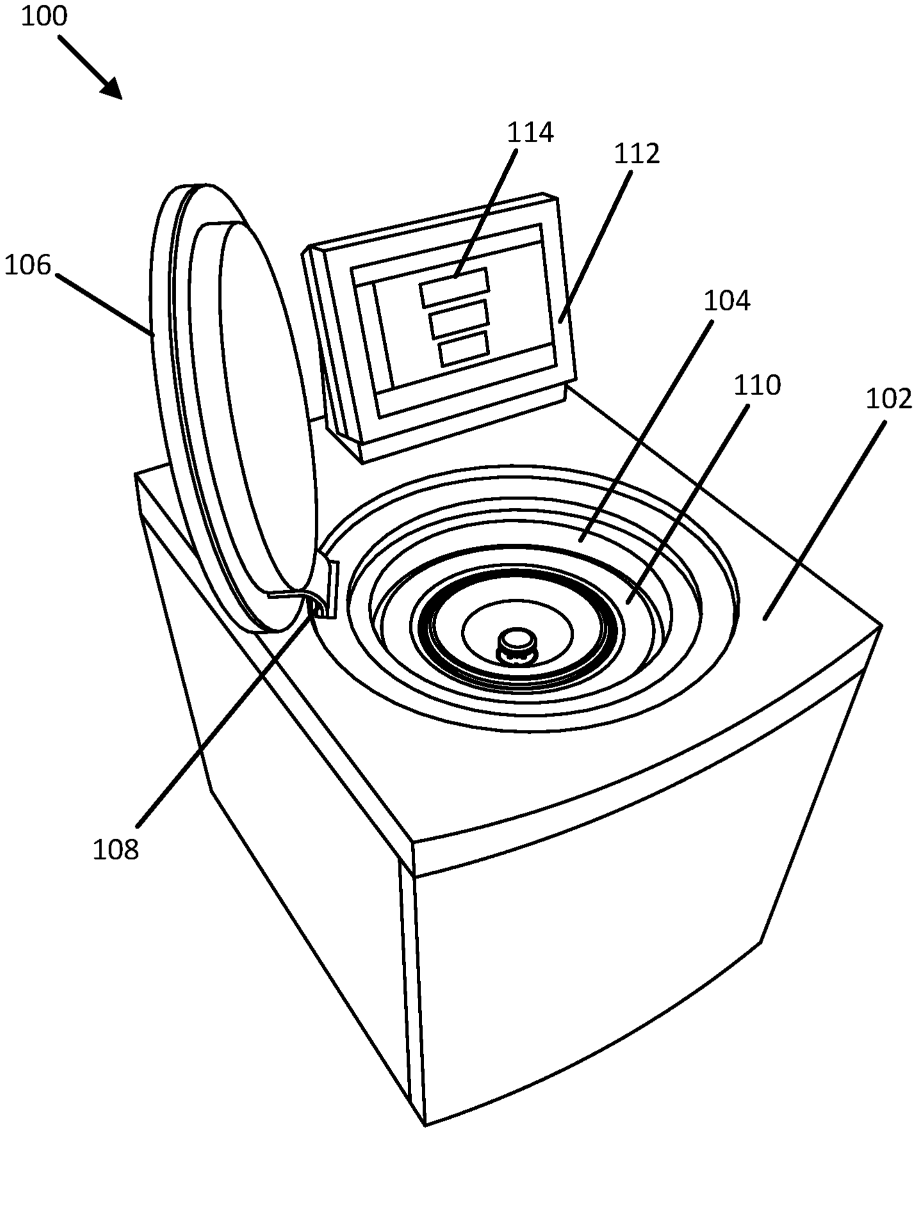
FIG. 1 illustrates a perspective view of an example centrifuge in an open position with a rotor mounted thereto.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates a perspective view of an example centrifuge 100. The centrifuge includes a housing 102 that defines an enclosed chamber 104. A door 106 is attached to the housing 102 via a hinge 108. The door 106 can hinge between open and closed positions to provide access to the enclosed chamber 104 of the centrifuge. In the example depicted in FIG. 1, the door 106 is in an open position.

When the door 106 is in the open position, a rotor 110 can be mounted inside the enclosed chamber 104 of the centrifuge. The rotor 110 is mounted to a drive connected to a motor (not shown) of the centrifuge. During operation of the centrifuge, the door 106 is closed for sealing the rotor 110 inside the enclosed chamber 104.

A technician may operate the centrifuge 100 by first moving the door 106 to the open position for accessing the enclosed chamber 104. The technician can then load containers of samples into the rotor 110. Next, the technician moves the door 106 to the closed position, and may utilize controls 114 displayed on a screen 112 for selecting various modes of operation. According to the mode of operation selected by the technician, the motor spins the rotor 110 about a central axis substantially perpendicular to the ground for a set period of time and at one or more set rotation speeds.

In some examples, instead of loading containers of samples into the rotor 110 when the door 106 is in the open position, the technician can replace the rotor 110 with a replacement rotor that may include containers of samples that are pre-loaded. In some examples, the replacement rotor may or may not include pre-loaded containers of samples, and the technician can load containers of samples into the replacement rotor after it has been mounted inside the enclosed chamber 104 of the centrifuge.

Figure 2:
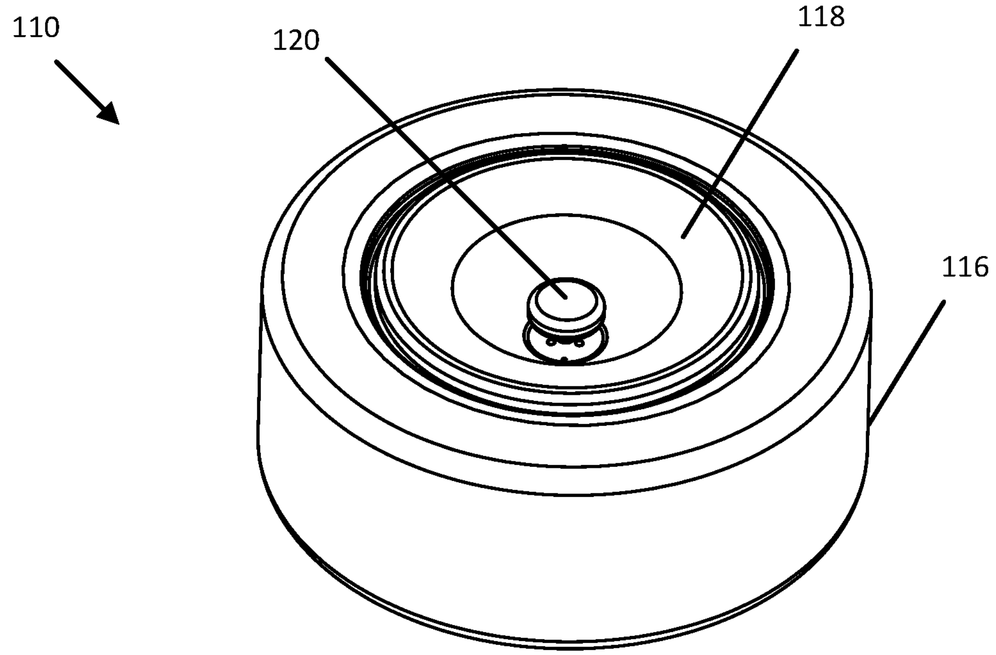
FIG. 2 illustrates a perspective view of an example rotor.

FIG. 2 shows a top perspective view of the rotor 110. The rotor 110 includes a rotor body 116 and a cover 118. A tie-down bolt can be used to removably attach the cover 118 to the rotor body 116.

Figure 3:
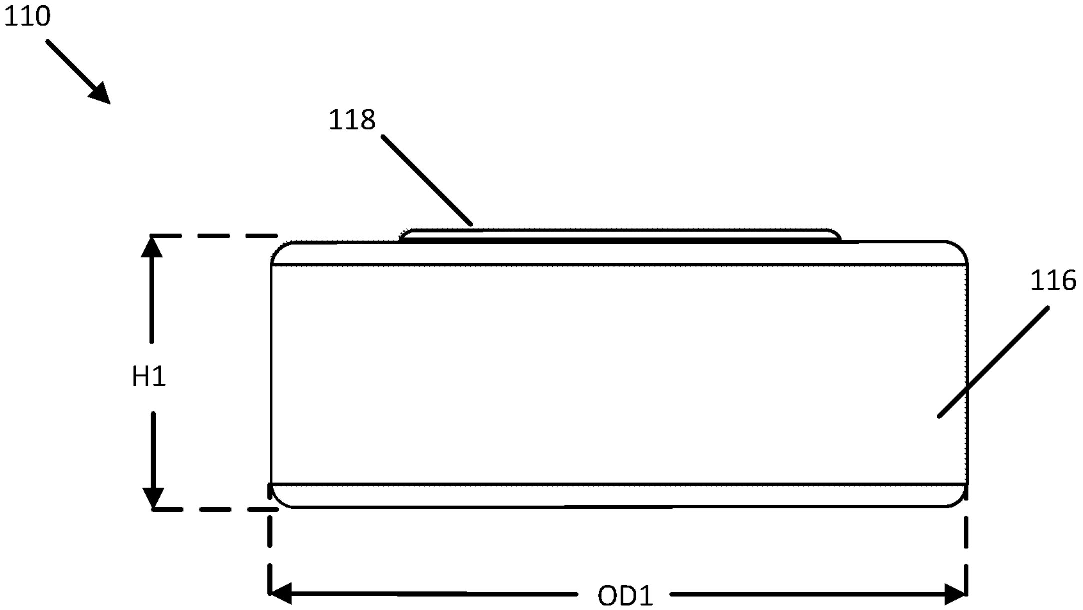
FIG. 3 illustrates a side view of an example rotor.

FIG. 3 shows a side view of the rotor 110. The rotor body 116 has a height H1 and an outside diameter OD1. In one example, the height H1 is in a range from 5 to 10 inches. In one example, the outside diameter OD1 is in a range from 14 to 24 inches.

Figure 4:
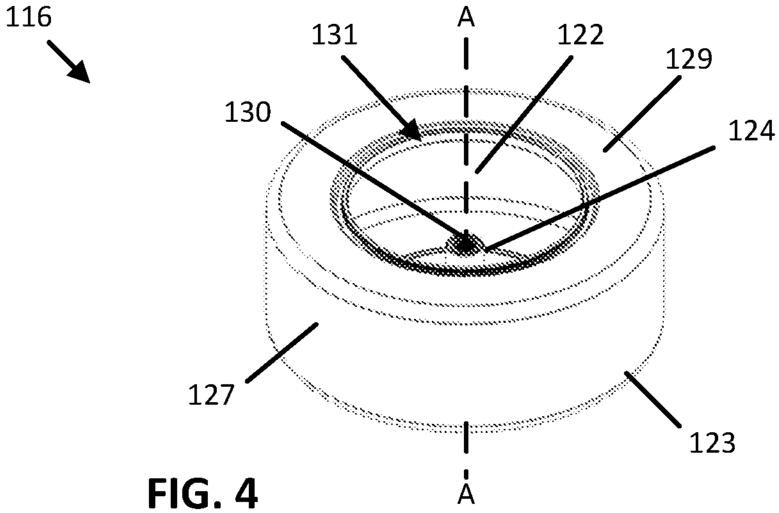
FIG. 4 illustrates a perspective view of an example rotor body.
Figure 5:
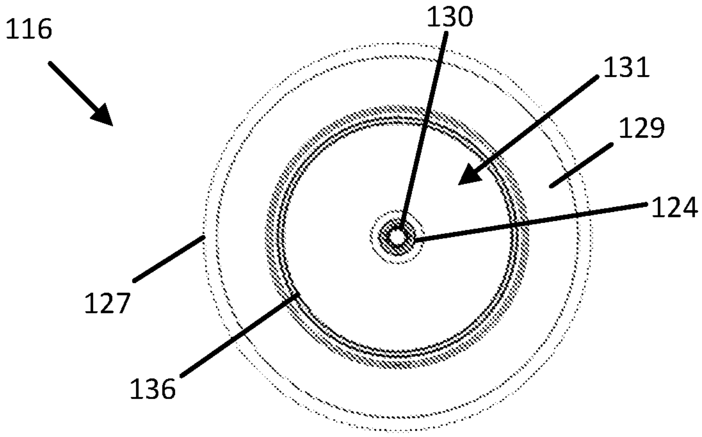
FIG. 5 illustrates a top view of an example rotor body.
Figure 6:
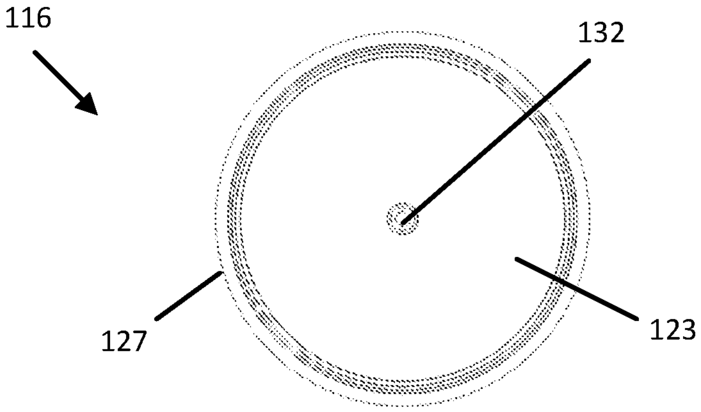
FIG. 6 illustrates a bottom view of an example rotor body.

FIGS. 4, 5, and 6 show perspective, top, and bottom views, respectively, of the rotor body 116. As shown in FIGS. 4-6, the rotor body 116 includes a base 123, a sidewall 127, a top 129, and an annulus cavity 122. The rotor body 116 defines an opening 131 on the top 129 that provides access to the annulus cavity 122. As shown in FIG. 5, the opening 131 includes a peripheral edge 136. The cover 118 is removably attachable to the rotor body 116 for sealing the annulus cavity 122. The sidewall 127 and top 129 give the rotor body 116 a shape similar to the shape of a tire.

A drive hub 124 extends from a portion of the base 123 of the rotor body 116 and receives a drive shaft of a centrifuge motor. The drive hub 124 is a cylindrically shaped column having a first opening 130 and a second opening 132.

Figure 7:
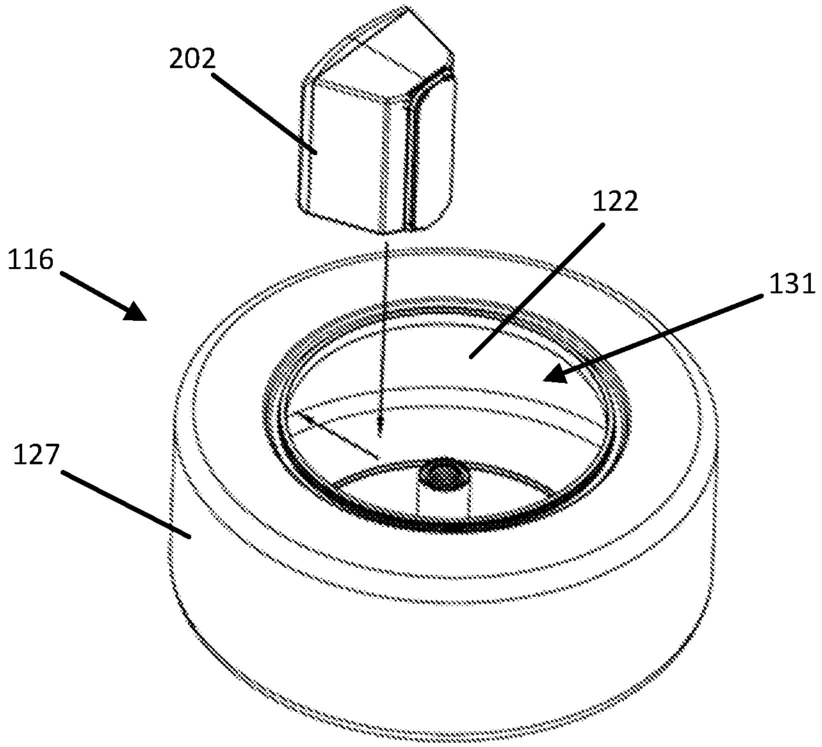
FIG. 7 illustrates an example sample container positioned above an opening of an example rotor body.
Figure 8:
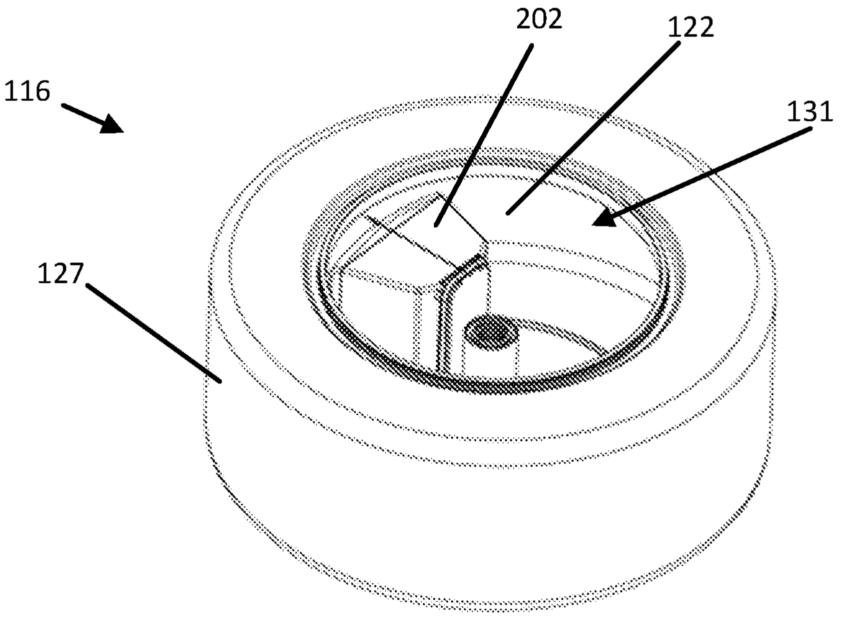
FIG. 8 shows an example sample container positioned inside an annulus cavity of an example rotor body.
Figure 9:
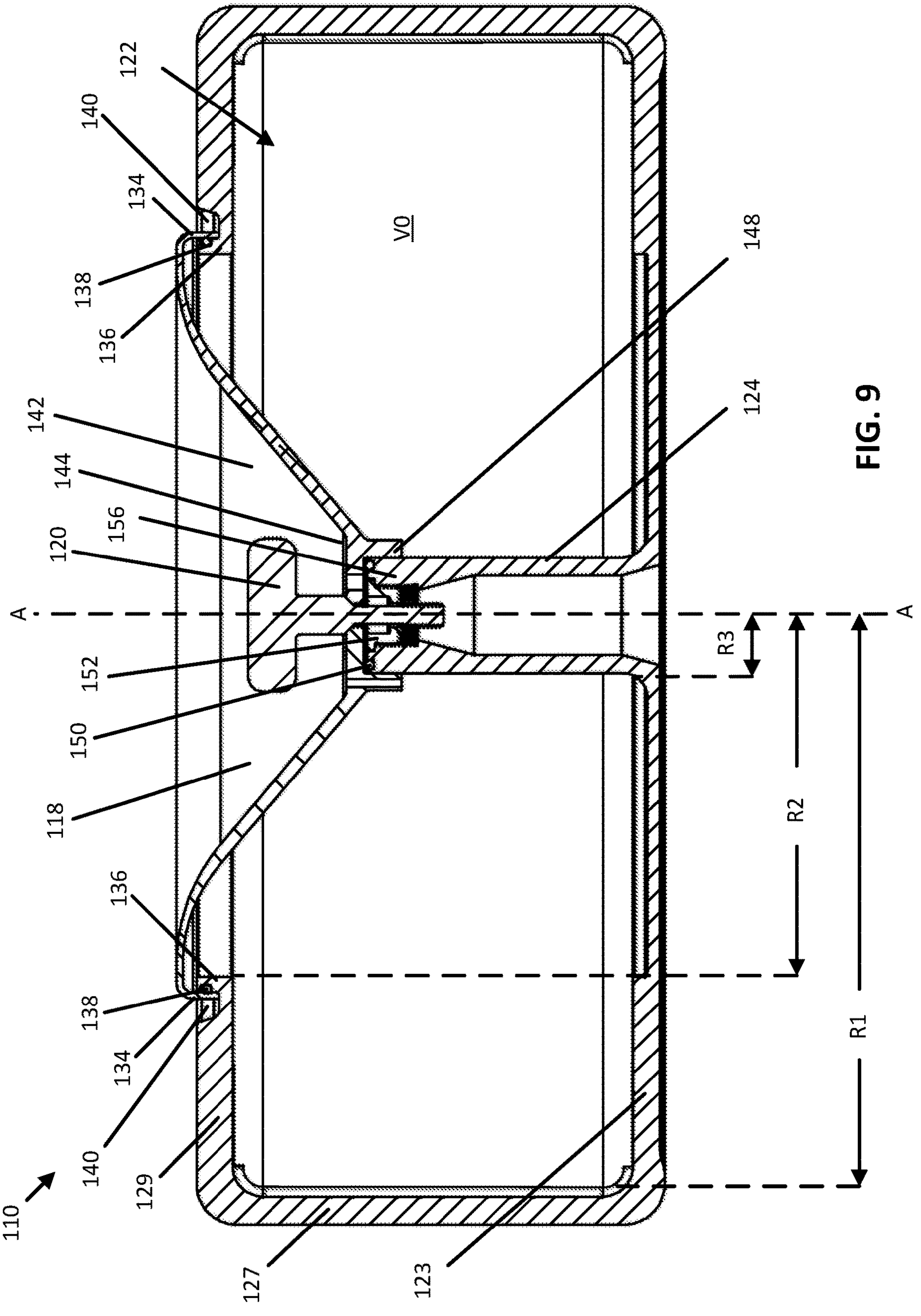
FIG. 9 illustrates a cross-sectional side view of an example rotor body with a cover attached thereto.

FIG. 7 shows a sample container 202 positioned above the opening 131 of the rotor body 116. FIG. 8 shows the sample container 202 positioned inside the annulus cavity 122 of the rotor body 116. FIG. 9 shows a cross-sectional side view of the cover 118 attached to the rotor body 116. Referring now to FIGS. 7-9, the annulus cavity 122 has a shape for storing one or more sample containers 202.

In FIGS. 7 and 8, the sample container 202 is a first container. As will be described in more detail (in particular with reference to FIGS. 18, 20, and 21), the annulus cavity 122 may store one or more additional containers such as a second container of a different type and a third container of a different type as well as one or more adapters arranged between the various types of containers. The shape of the annulus cavity 122 allows the various types of containers and adapters to be aligned against the sidewall 127.

As shown in FIG. 9, the shape of the annulus cavity 122 defines an annulus cavity radius R1 between the sidewall 127 and a central axis A-A of the rotor body 116, an opening radius R2 between the peripheral edge 136 of the opening and the central axis A-A, and a drive hub radius R3 between an outer surface of the drive hub 124 and the central axis A-A. The annulus cavity 122 also defines a total annulus volume V0.

A relationship between the annulus cavity radius R1, the opening radius R2, and the drive hub radius R3 ensures that the sample container 202 can be lowered into the annulus cavity 122 through the opening 131, and that the sample container 202 can be pushed against the sidewall 127 of the rotor body 116 for using the base 123, sidewall 127, and top 129 to constrain the sample container inside the annulus cavity 122.

In some examples, the annulus cavity radius R1 is in a range from 6 inches to 12 inches, and in other examples is in a range from 8 inches to 10 inches. In some examples, the opening radius R2 is in a range from 3.5 inches to 7 inches, and in other examples is in a range from 4 to 6 inches. In some examples, the drive hub radius R3 is in a range from 0.50 inches to 2 inches, and in other examples is in a range from 0.75 inches to 1 inch. In some examples, the opening radius R2 is in a range from 40% to 70% the annulus cavity radius R1, and in other examples the opening radius R2 is in a range from 50% to 60% the annulus cavity radius R1. In some examples, the total annulus volume V0 is in a range from 12 to 22 liters, and in other examples the total annulus volume V0 is in a range from 16 to 20 liters.

In some examples, a relationship between the annulus cavity radius R1, the opening radius R2, and the drive hub radius R3, can be defined by the following equation in which N is the number of sample containers inside the annulus cavity 122.

$$2\times\sqrt{(R2^2-R3^2)}\geq 2\times R1\times\sin\left(\frac{\frac{360}{N}}{2}\right) \tag{1}$$

The relationship between the annulus cavity radius R1, the opening radius R2, and the drive hub radius R3 is such that the rotor body 116 is sized to receive one or more sample containers 202 as the one or more sample containers are lowered into the annulus cavity 122 and to constrain the one or more sample containers 202 inside the annulus cavity between the base 123, the sidewall 127, and the top 129 when the one or more containers are advanced radially from the lowered position.

Figure 10:
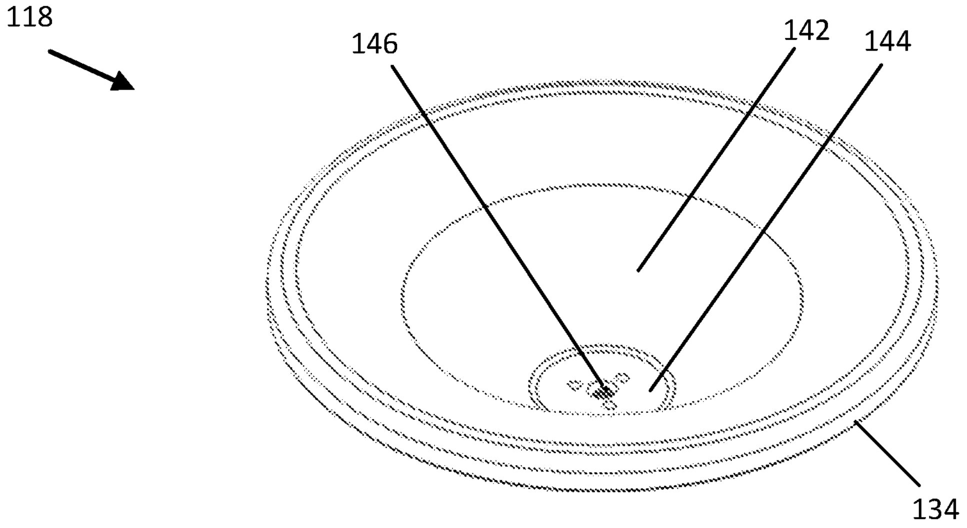
FIG. 10 illustrates a top perspective view of an example cover.
Figure 11:
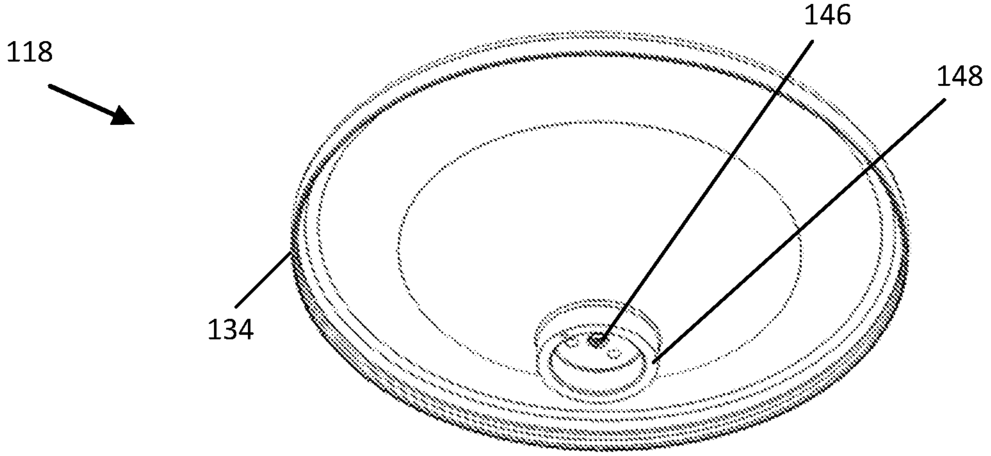
FIG. 11 illustrates a bottom perspective view of an example cover.
Figure 12:
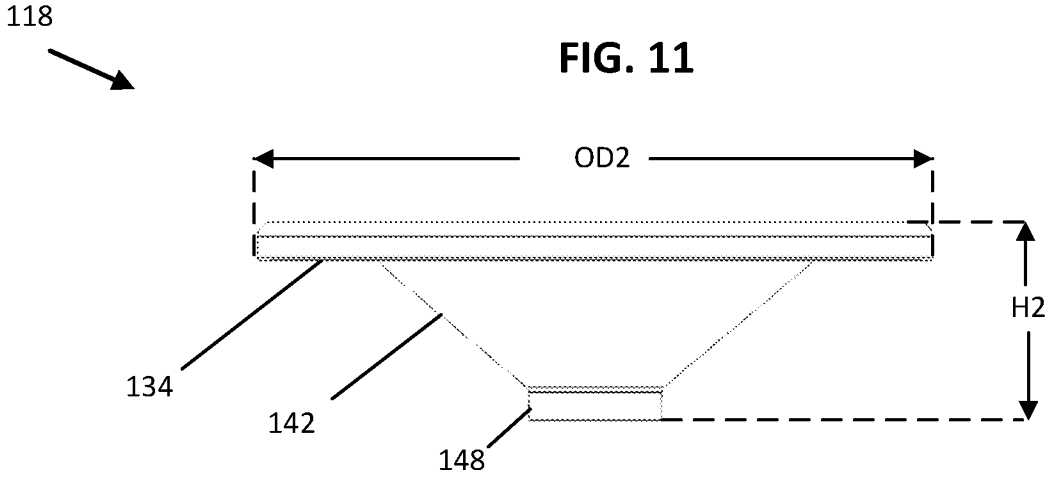
FIG. 12 shows a side view of an example cover.

FIGS. 10, 11, and 12 show top perspective, bottom perspective, and side views, respectively, of the cover 118. Referring now to FIGS. 9-12, the cover 118 is removably attachable to the rotor body 116 for sealing the annulus cavity 122. In some examples, the cover 118 has a circular shape for covering the opening 131.

The cover 118 includes a lip 134 that has an inside diameter that substantially corresponds to an outside diameter of the peripheral edge 136 of the opening 131. In some examples, such as the example depicted in FIG. 12, the top surface of the rotor body 116 includes an annular indenture 140 that surrounds the opening of the rotor body. In other examples, the top surface of the rotor body 116 does not include an annular indenture. The lip 134 of the cover 118 fits snugly around the peripheral edge 136 of the rotor body 116 for sealing the annulus cavity 122. In some examples, a rubber O-ring 138 is placed around the peripheral edge 136 for improving the seal between the cover 118 and the rotor body 116.

The cover 118 further includes a depression 142 that terminates into a surface 144. The surface 144 is substantially parallel to the base 123 of the rotor body 116 and includes a threaded bore 146 for threadedly receiving the tie-down bolt 120. As depicted in FIGS. 10-12, the bottom of the cover 118 includes a cylindrical flange 148 that has an inside diameter that substantially corresponds to an outside diameter of the drive hub 124 of the rotor body 116 so that the cover 118 snugly fits around the drive hub 124. In some examples, a top surface of the drive hub may include a circular an O-ring 150 for improving the seal between the cover 118 and the drive hub 124 of the rotor body 116.

As shown in FIG. 12, the cover 118 has a height H2 which may be influenced by the height of the drive hub 124 and the one or more sample containers 202. The cover 118 also has an outside diameter OD2 that may be influenced by the outer circumference C2 of the opening 131. In some examples, the height H2 is in a range from 2 inches to 4 inches, and in other examples the height H2 is in a range from 2.3 inches to 3.6 inches. In some examples, the outside diameter OD2 is in a range from 4 inches to 8 inches, and in other examples the outside diameter OD2 is in a range from 5 inches to 7 inches.

In certain examples, the rotor body 116 and/or the cover 118 can be made from aluminum. In some instances, the rotor body and/or the cover 118 can be made from a different type of material such as titanium, stainless steel, or other similar type of metal material.

Figure 13:
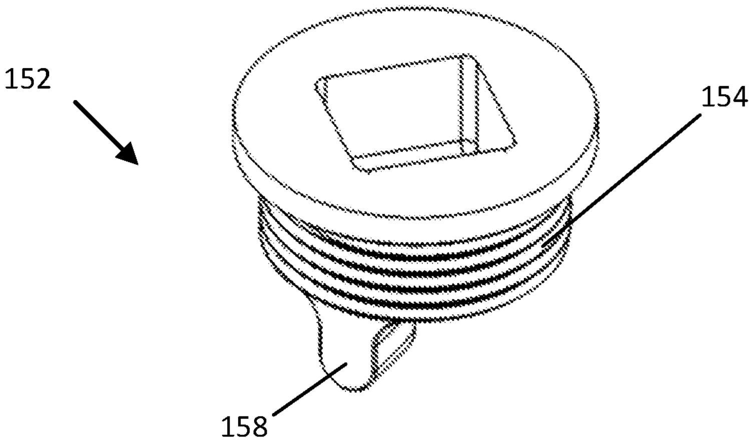
FIG. 13 illustrates a top perspective view of an example drive adapter.
Figure 14:
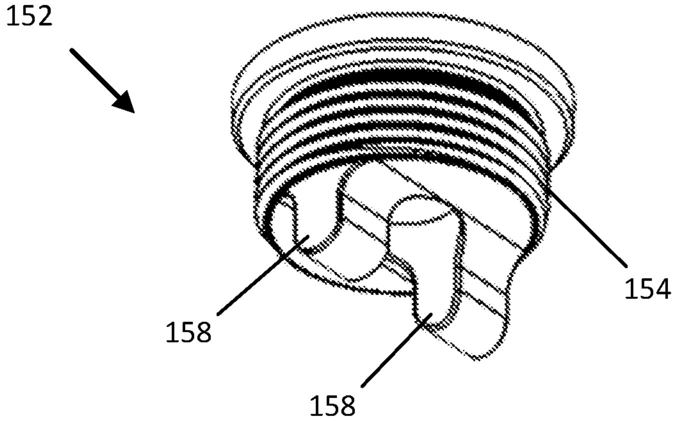
FIG. 14 illustrates a bottom perspective view of an example drive adapter.

FIG. 13 shows a top perspective view of a drive adapter 152. FIG. 14 shows a bottom perspective view of the drive adapter 152. Referring now to FIGS. 12-14, the drive adapter 152 includes a threaded exterior surface 154 that threads onto a threaded interior surface 156 of the drive hub 124. The drive adapter 152 includes ribs 158 that engage the drive shaft of the motor of the centrifuge. The transfer of torque from the drive shaft to the rotor 110 causes the rotor 110 to spin about the central axis A-A.

Figure 15:
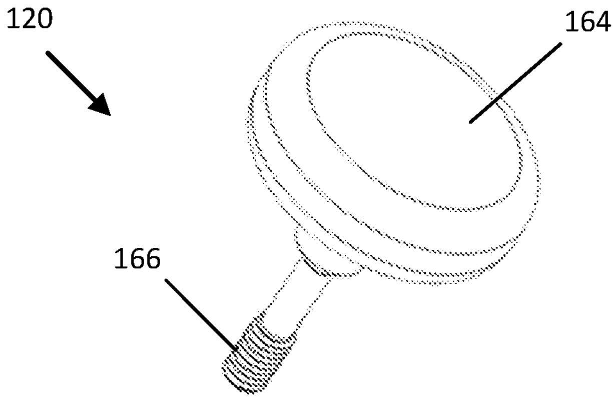
FIG. 15 illustrates a perspective view of an example tie-down bolt.

FIG. 15 shows a perspective view of the tie-down bolt 120. The tie-down bolt 120 includes a threaded portion 166 and a knob 164 that allow a technician to twist the tie-down bolt 120 in either clockwise or counterclockwise directions for securing the cover 118 to the rotor body 116, and removing the cover 118 from the rotor body 116.

Figure 16:
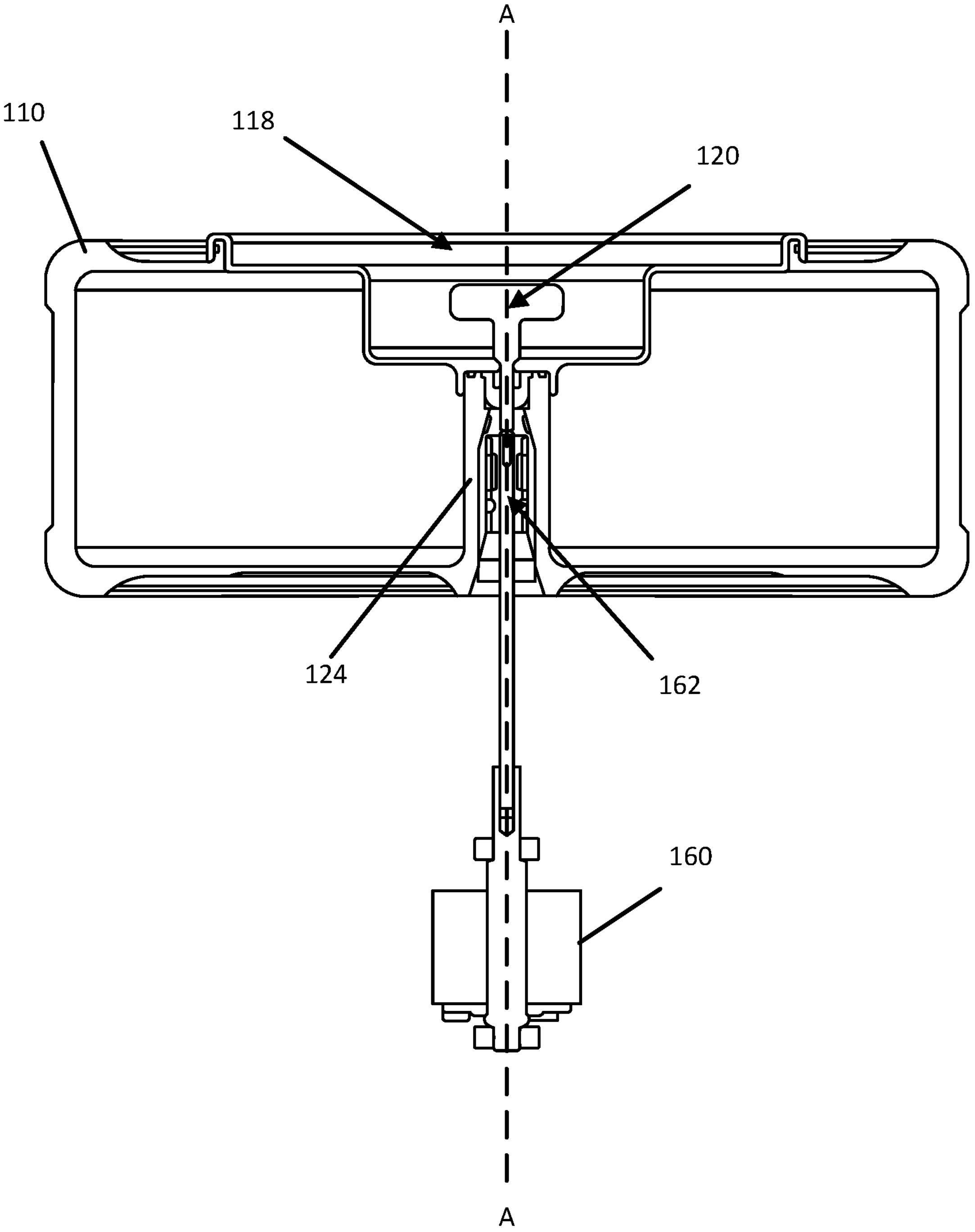
FIG. 16 illustrates a cross-sectional side view of an example rotor engaged with a motor of a centrifuge.

FIG. 16 shows a cross-sectional side view of the rotor 110 engaged with a motor 160 of the centrifuge. A drive shaft 162 is connected to the motor 160 and extends from the motor 160 in a vertical direction substantially perpendicular to the ground. The drive shaft 162 includes bosses that can be slotted inside the drive hub 124 of the rotor 110. When inside the drive hub 124, the bosses of the drive shaft 162 engage the ribs of the drive adapter for transferring torque from the motor 160 to the rotor 110. Thus, the motor 160 drives the rotor 110 to rotate about the central axis A-A when in operation.

Figure 17:
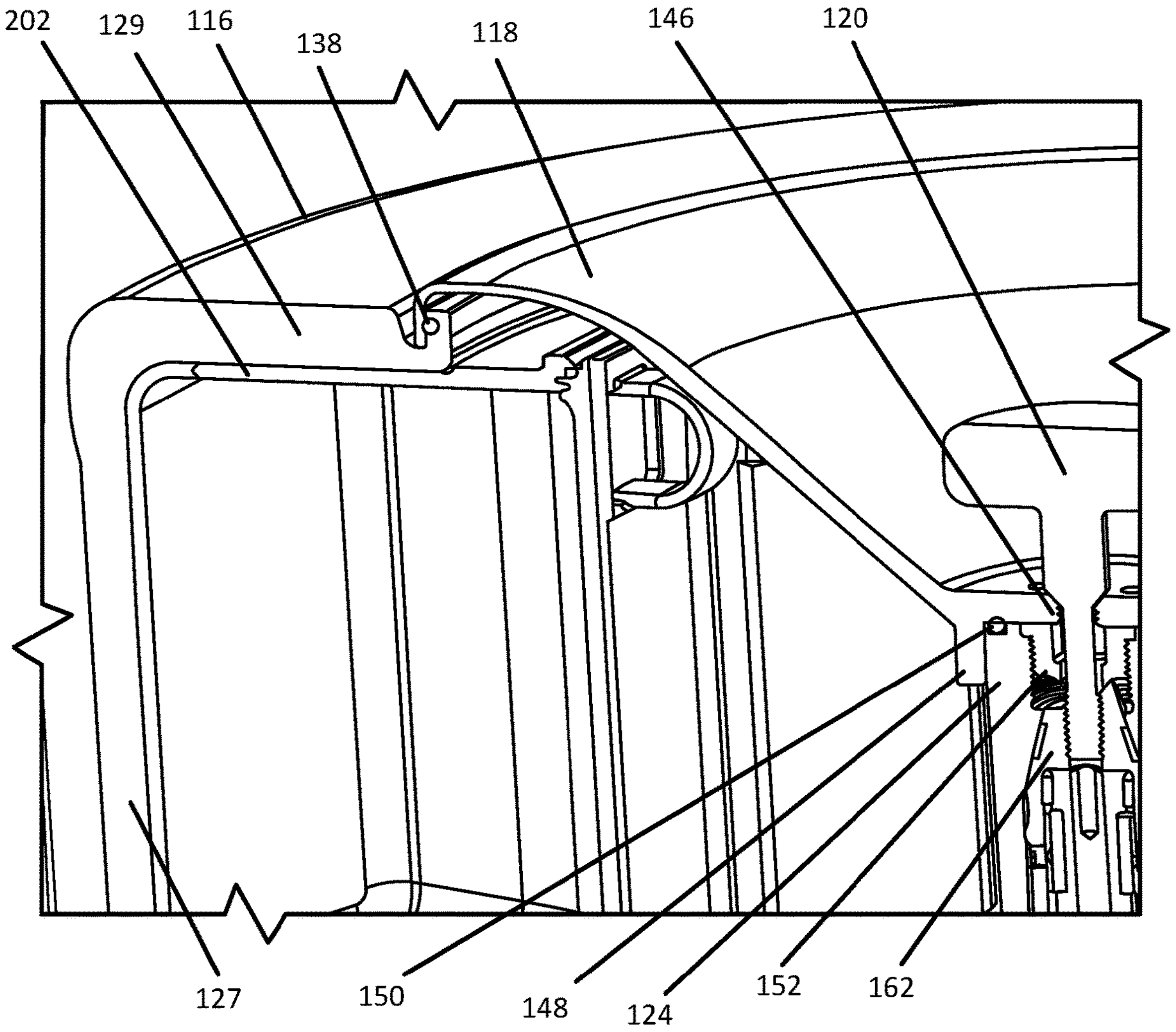
FIG. 17 illustrates an enlarged cross-sectional view of an example tie-down bolt engaged with a drive shaft of the centrifuge.

FIG. 17 is an enlarged cross-sectional view of the cover 118 attached to the rotor body 116. The tie-down bolt 120 threads through the cover 118 and the drive adapter 152 for threadedly engaging the drive shaft 162. Thus, the tie-down bolt 120 can be used to removably attach the cover 118 and the rotor body 116 to the drive shaft 162 of the centrifuge motor. This ensures that the rotor 110 is well secured during operation of the centrifuge, enhancing the security and safety of the centrifuge.

In some examples, the threaded exterior surface 154 of the drive adapter 152 is a left-hand thread and the threaded portion 166 of the tie-down bolt 120 is a right-handed thread. In alternative examples, the threaded exterior surface 154 of the drive adapter 152 is a right-hand thread and the threaded portion 166 of the tie-down bolt 120 is a left-handed thread. The opposite threading of the drive adapter 152 and the tie-down bolt 120 improves the security of the rotor 110 because during acceleration of the rotor, driving torque will cause at least one of the drive adapter 152 and the tie-down bolt 120 to tighten. Similarly, during deceleration of the rotor 110, driving torque will also cause at least one of the drive adapter 152 and the tie-down bolt 120 to tighten.

Still referring to FIG. 17, when the sample container 202 is lowered into the annulus cavity 122 and advanced radially (e.g., pushed) against the sidewall 127 of the rotor body 116, the sample container 202 is engaged by the top 129, the sidewall 127, and the base 123 of the rotor body 116 in a snug fit. Thus, the annulus cavity 122 constrains the sample container inside the rotor body 116. As will be explained in more detail with reference to FIGS. 18-21, multiple types of containers and adapters can be loaded inside the annulus cavity 122. When multiple containers and adapters are inserted in the annulus cavity, the sample container can also be engaged on its sides by another container or adapter inside the annulus cavity 122 so that the sample container will also be constrained laterally.

Figure 18:
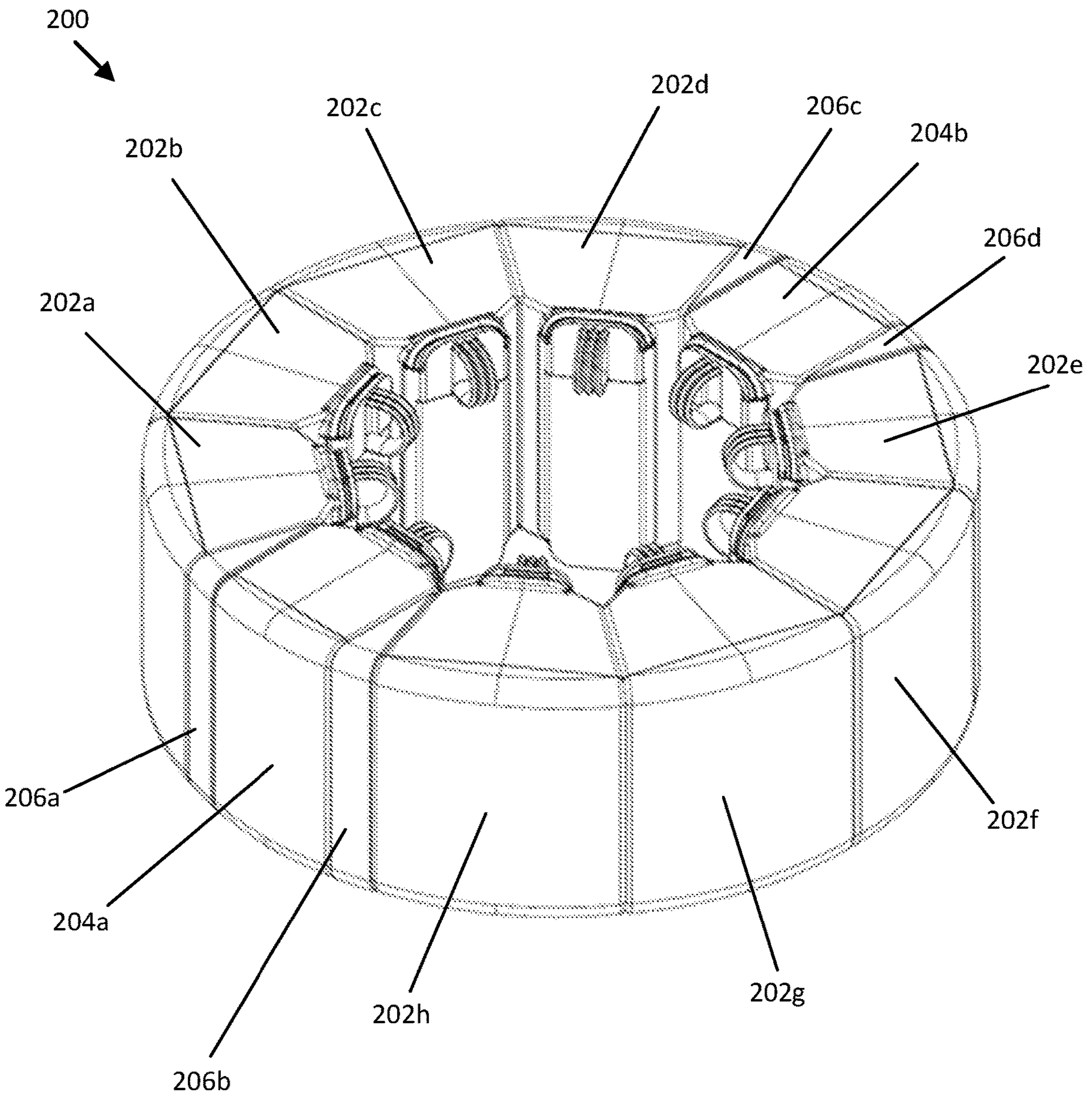
FIG. 18 illustrates an example container arrangement for a centrifuge.

FIG. 18 shows a container arrangement 200 that can be stored inside the annulus cavity of the rotor. The container arrangement 200 includes one or more sample containers 202 (e.g., a first container of a first type) and one or more containers 204 (e.g., a second container of a different type). In some embodiments, the one or more sample containers 202 are "sector" containers, and the one or more containers 204 "key" containers. The container arrangement 200 may also include one or more adapters 206 wedged between the sector containers 202 and the key containers 204.

Due to the wedge shape of the sector containers 202, it is not possible to load a container arrangement that includes only sector containers inside the annulus cavity 122, because the wedge shape will prevent a full complement of sector containers to be pushed against the sidewall 127 of the rotor body 116. Instead, the container arrangement must include at least one key container 204 so that a full arrangement of containers can be loaded inside the annulus cavity 122. Thus, at least one purpose of the key containers 204 is to enable the loading of the sector containers 202 inside the annulus cavity 122.

The sample volumes in the sector containers 202 are approximately equal to create a uniform hydrostatic pressure between adjacent containers. In examples where only one key container 204 is present in the container arrangement (such as the example shown in FIG. 20), an imbalance may be present in the container arrangement. In this case, the wedge angle of the sector containers 202 may be changed or the imbalance may be tolerable in the centrifuge. In some examples, a counter balance, a ball balancer, and the like can be used to counteract the imbalance.

The container arrangement 200 allows various sample quantities to be loaded inside the rotor 110. A range of sample volumes may be dependent upon the desired sample volume, the size of the annulus cavity 122, and the weight capacity of the rotor 110 and the centrifuge 100. In some examples, the container arrangement 200 may allow a range of sample volumes from 2 L up to 20 L to be loaded into the rotor 110. Additionally, the compact design of the rotor 110 allows it to be mounted to existing centrifuges having a compact footprint such as the centrifuge 100 depicted in FIG. 1.

When used in existing centrifuges, the rotor 110 and the container arrangement 200 produce higher radial accelerations and lower k-factors than rotors of comparable sample volume. For example, the rotor 110 and the container arrangement 200 may exceed radial accelerations of 15,000×G at a k-factor less than 2000.

Another advantage of the rotor 110 and the container arrangement 200 is that they permit a technician to change samples immediately after centrifugation. For example, a technician can swap containers having a sample with other containers having different samples. This is not possible with continuous flow centrifuge rotors.

In the example shown in FIG. 18, the container arrangement 200 includes eight sector containers 202 (e.g., sector containers 202*a-h*). In other examples, the container arrangement may include fewer than eight sector containers 202. Still, in other examples, the container arrangement may have more than eight sector containers 202.

In the example shown in FIG. 18, the container arrangement 200 includes two key containers 204 (e.g., key containers 204*a* and 204*b*). In other examples, the container arrangement may include only one key container 204. Still, in other examples, the container arrangement may have more than two key containers 204.

In the example shown in FIG. 18, the container arrangement 200 includes four adapters 206 (e.g., adapters 206*a-d*), each adapter positioned next to a side surface of each key container 204. The number of adapters 206 may correspond to the number of sector containers 202 and key containers 204 included in the container arrangement, and therefore in other examples, there may be fewer than four adapters 206 or more than four adapters 206. The adapters 206 fill the voids between the sector containers 202 and the key containers 204. The adapters 206 permit the use of a variety of shapes and sizes for the sector containers 202 and key containers 204, and different arrangements of these containers. In certain examples, the adapters are solid pieces. In other examples, the adapters are hollow pieces that can be filled with a volume of fluid as may be needed or desired.

Figure 19:
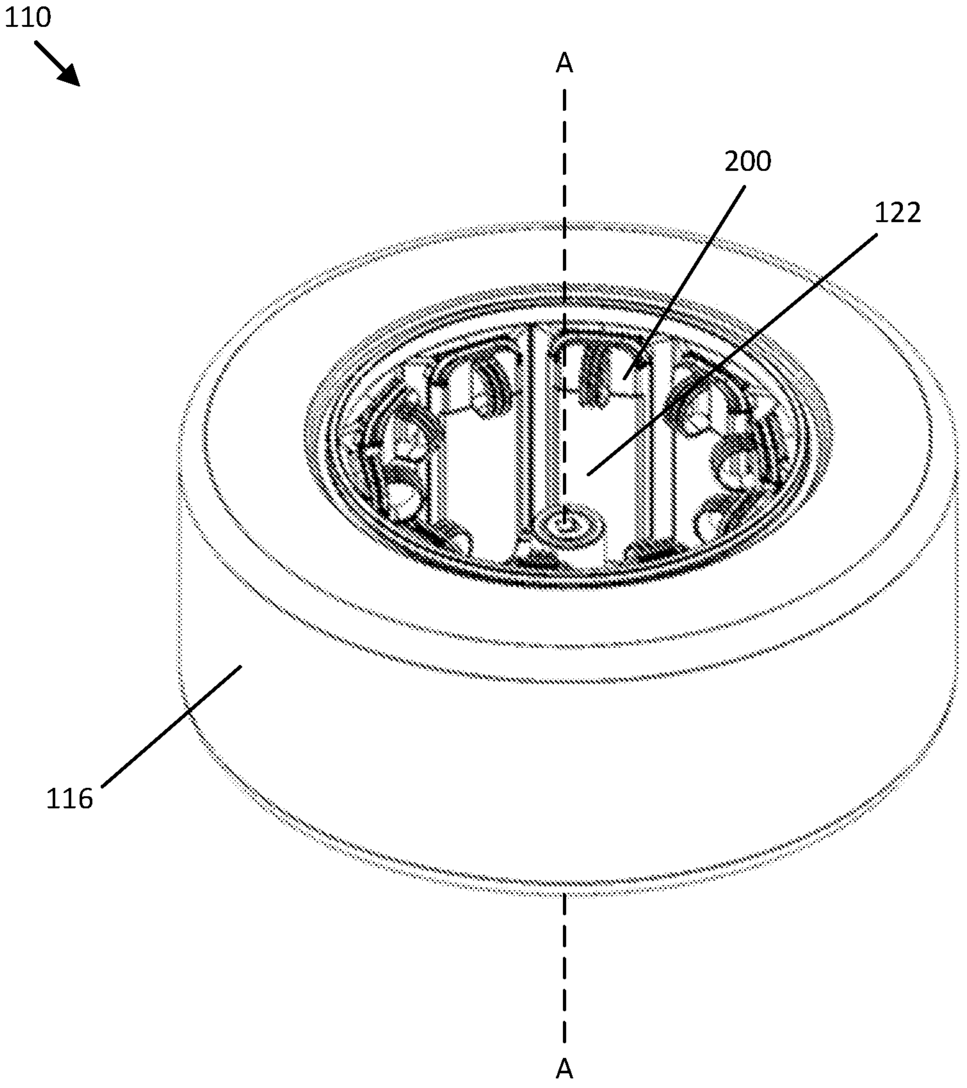
FIG. 19 illustrates a top perspective view of a rotor with a cover removed, and a container arrangement inside an annulus cavity of the rotor.

FIG. 19 shows a perspective view of the rotor 110 with the cover 118 removed, and the container arrangement 200 inside the annulus cavity 122 of the rotor body 116. Referring now to FIGS. 18 and 19, while the rotor 110 rotates about the central axis A-A, a sample volume inside the sector and key containers 202, 204 generates hydrostatic pressure which pushes outward onto the walls of the containers. The pressure on each container wall is reacted by an adjacent container 202, 204, an adapter 206, or the rotor body 116. Thus, each sector container 202 and key container 204 is filled with a similar sample volume so that the hydrostatic pressure exerted by adjacent containers is the same. In certain examples, one or more sector containers 202 can be replaced by one or more adapters 206 as may be needed or desired for balancing the hydrostatic forces from adjacent containers in the container arrangement 200.

Figure 20:
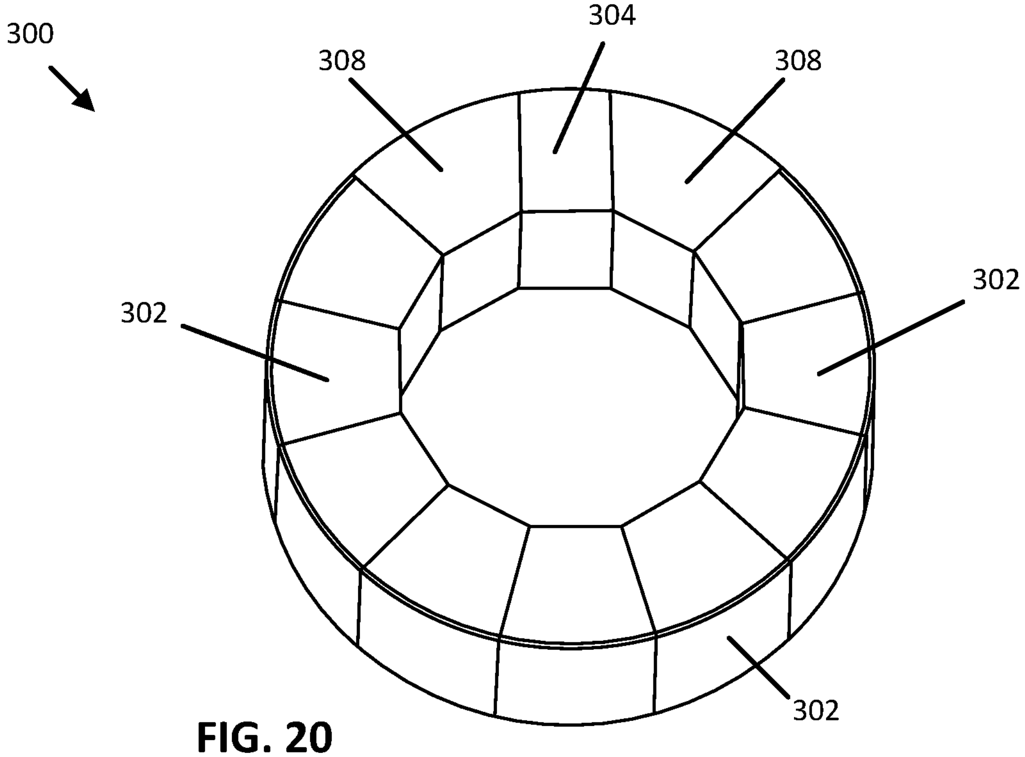
FIG. 20 illustrates an alternative container arrangement for a centrifuge.

FIG. 20 shows an alternative example of a container arrangement. In this example, a container arrangement 300 includes one key container 304, sector containers 302, and transition sample containers 308 (e.g., a third container of a different type). The transition sample containers 308 have a lopsided wedge shape and are constrained by at least the sidewall of the rotor when inserted in the centrifuge. The transition sample containers 308 have a wedge angle that is greater than a wedge angle of the sector containers 302. In the example depicted in FIG. 20, there are nine sector containers 302, two transition sample containers 308, and one key container 304 such that the container arrangement 300 has twelve containers total. In other examples, the number of sector containers 302 and transition sample containers 308, respectively, may vary.

Figure 21:
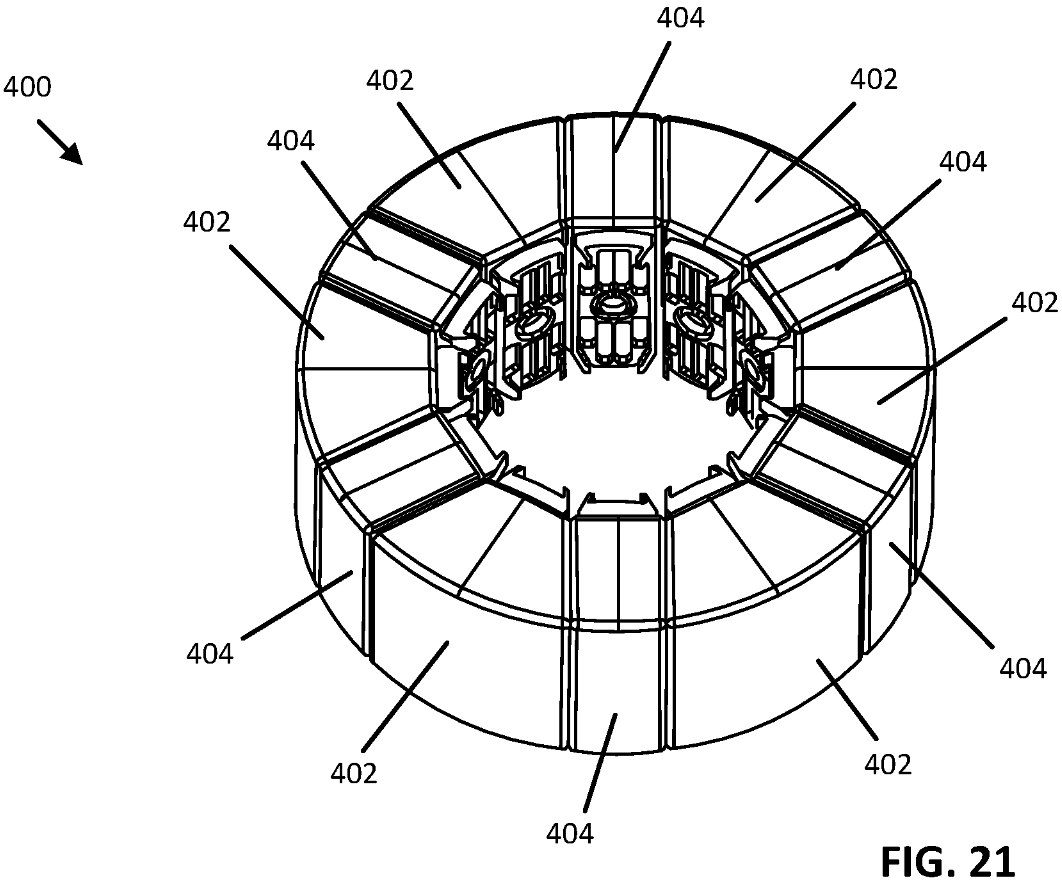
FIG. 21 illustrates another alternative container arrangement for a centrifuge.

FIG. 21 shows another alternative example of a container arrangement 400. In this example, only two types of containers are used: sector containers 402 and key containers 404. In this example, the sector and key containers 402, 404 are arranged in an alternating pattern. For example, six key containers 404 are alternated between six sector containers 402 such that the container arrangement 400 has twelve containers total. In other examples, the number of sector containers 402 and key containers 404 may vary.

Figure 22:
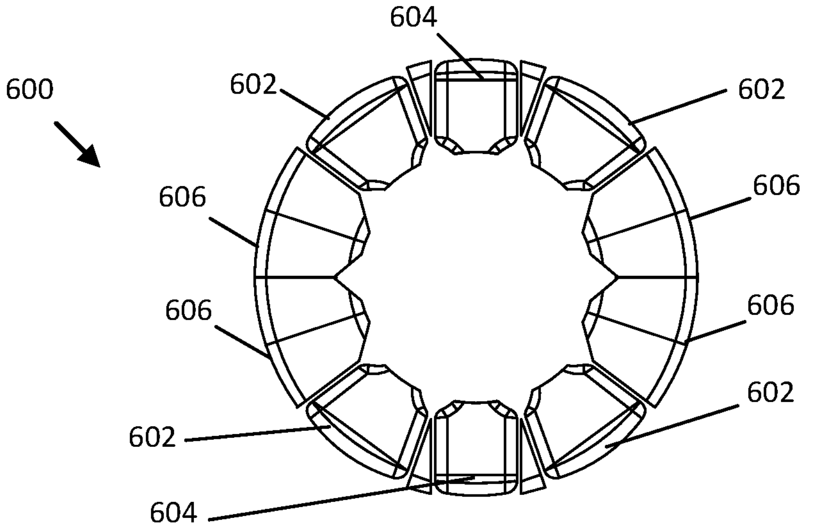
FIG. 22 illustrates another alternative container arrangement.

FIG. 22 shows another alternative example of a container arrangement 600. In this example, certain containers such as containers 602 and 604 are filled with a sample, whereas other containers, such as containers 606, are not filled with a sample and are empty. Thus, container arrangement 600 is a partially filled container arrangement.

Figure 23:
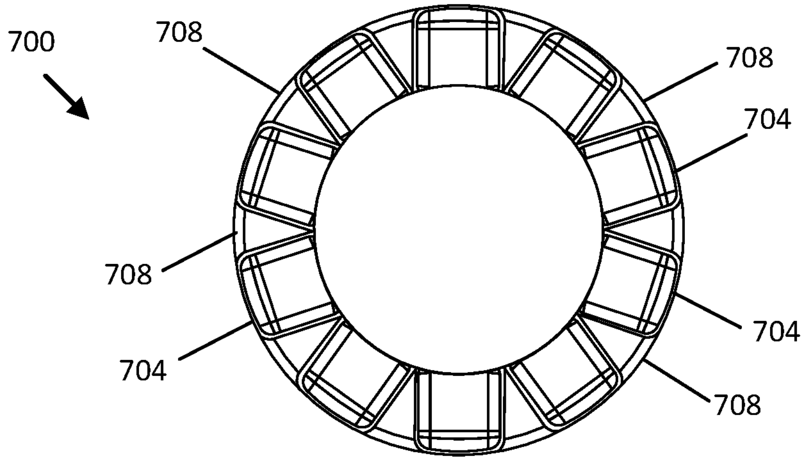
FIG. 23 illustrates another alternative container arrangement.

FIG. 23 shows another alternative example of a container arrangement 700. In this example, a series or strip of adapters 708 permits the loading of multiple key containers 704. When the strip is coiled, it can drop into the annulus cavity 122, and thereafter, can spring out (e.g., unfurl) to the sidewall 127 of the rotor body 116. Afterwards, the key containers 704 can be inserted into the annulus cavity 122, and can fill the empty spaces between the spaced adapters 708 of the strip. In this example, the container arrangement 700 includes only key containers 704 and adapters 708.

Figure 24:
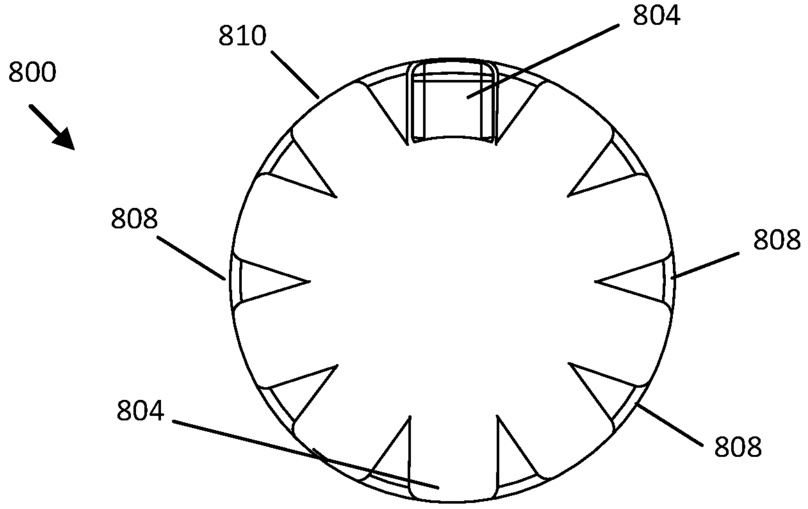
FIG. 24 illustrates another alternative container arrangement.
Figure 25:
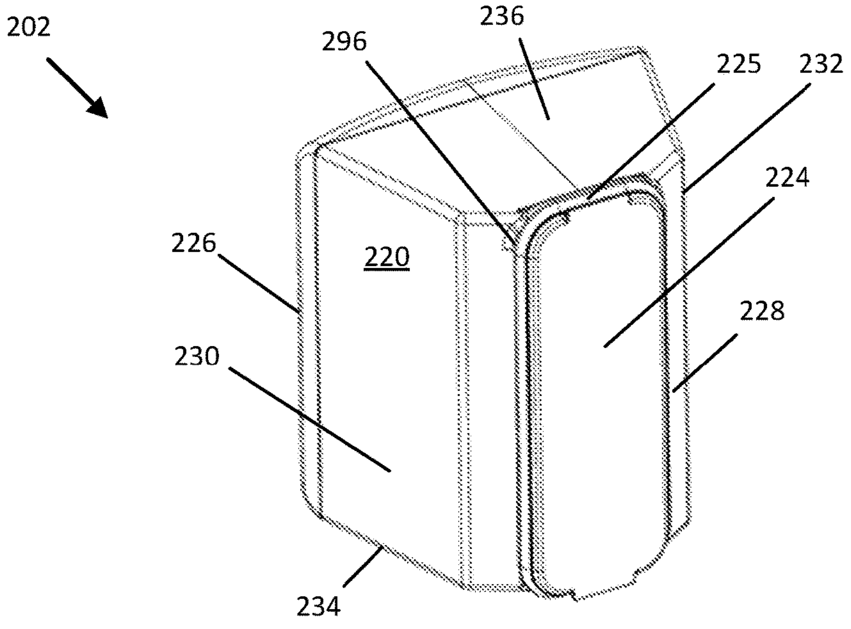
FIG. 25 illustrates a perspective view of an example sector container.
Figure 26:
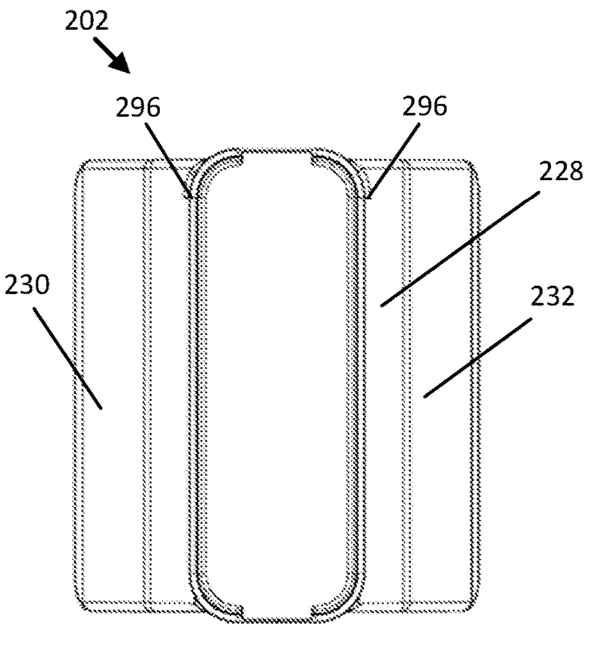
FIG. 26 illustrates a front view of an example sector container.
Figure 27:
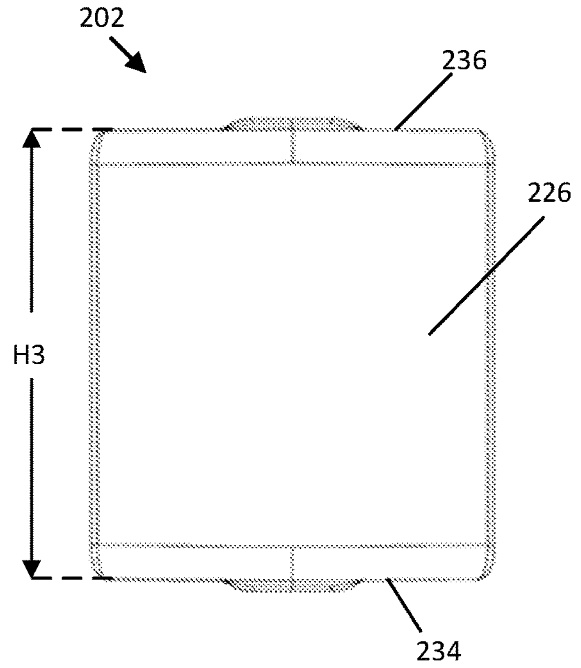
FIG. 27 illustrates a rear view of an example sector container.
Figure 28:
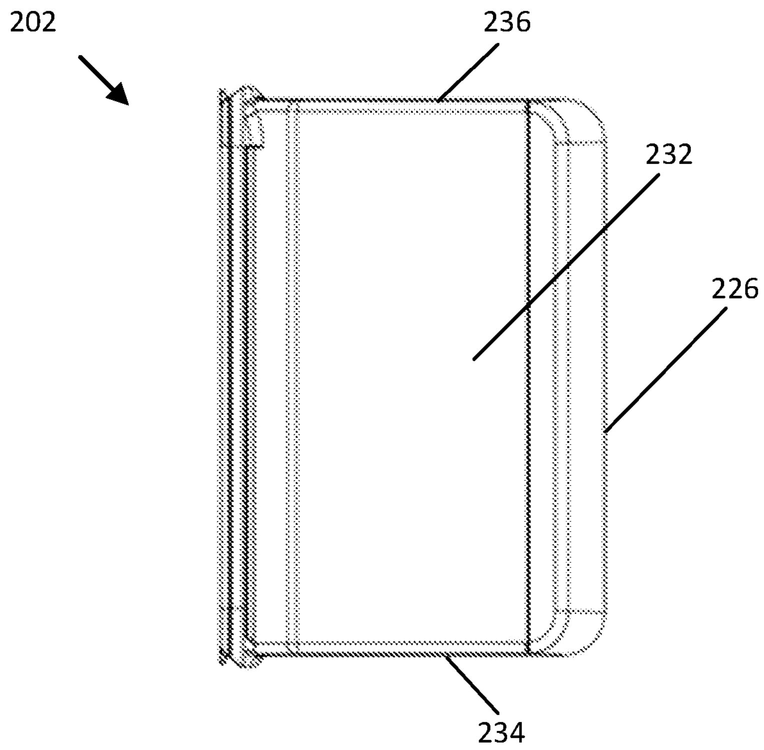
FIG. 28 illustrates a left side view of an example sector container; a right side view of the example sector container is substantially a mirror image.
Figure 29:
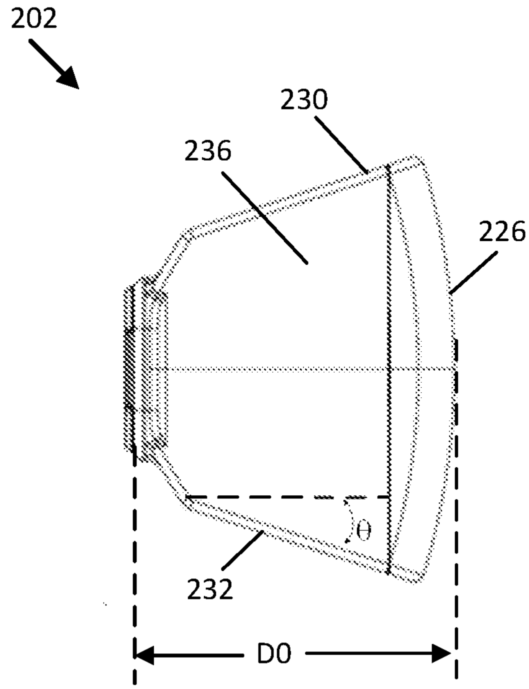
FIG. 29 illustrates a top view of an example sector container.
Figure 30:
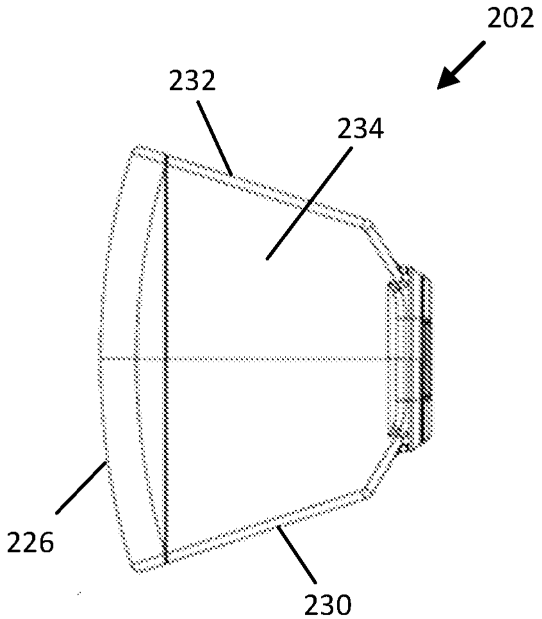
FIG. 30 illustrates a bottom view of an example sector container.
Figure 31:
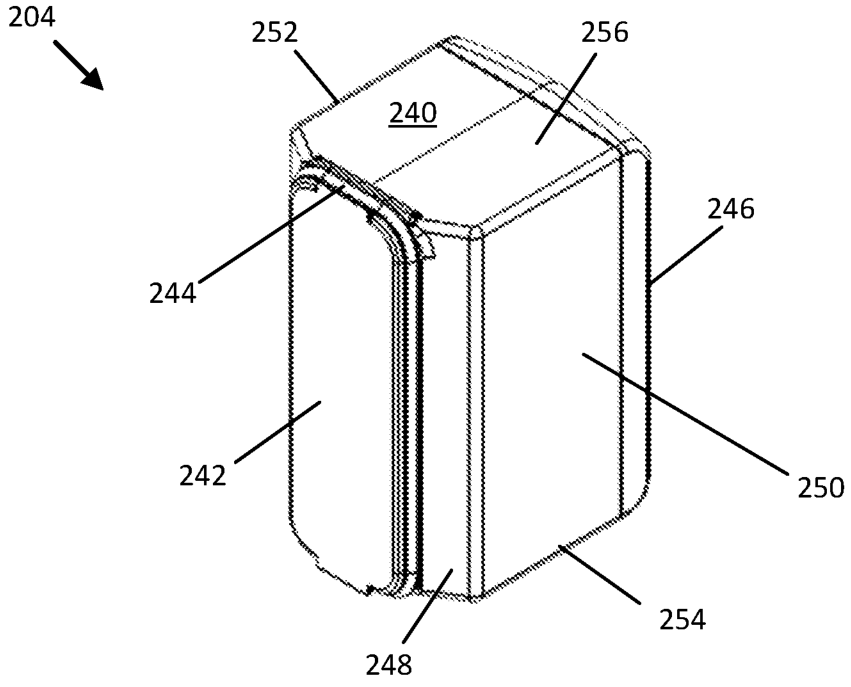
FIG. 31 illustrates a perspective view of an example key container.
Figure 32:
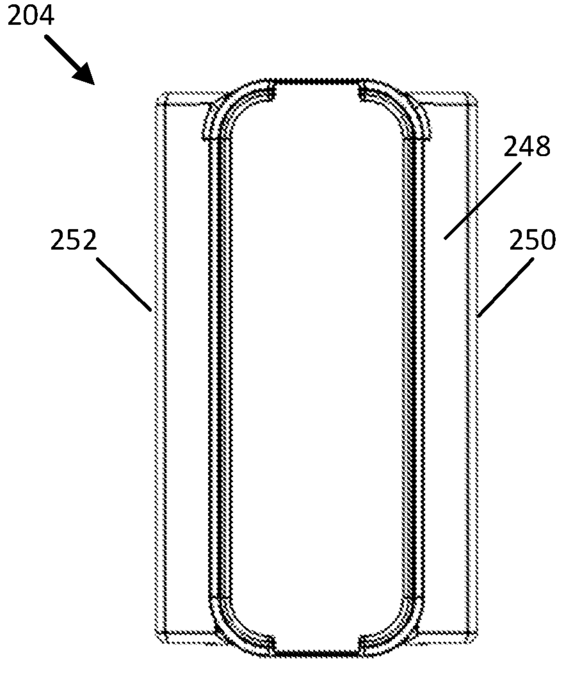
FIG. 32 illustrates a front view of an example key container.
Figure 33:
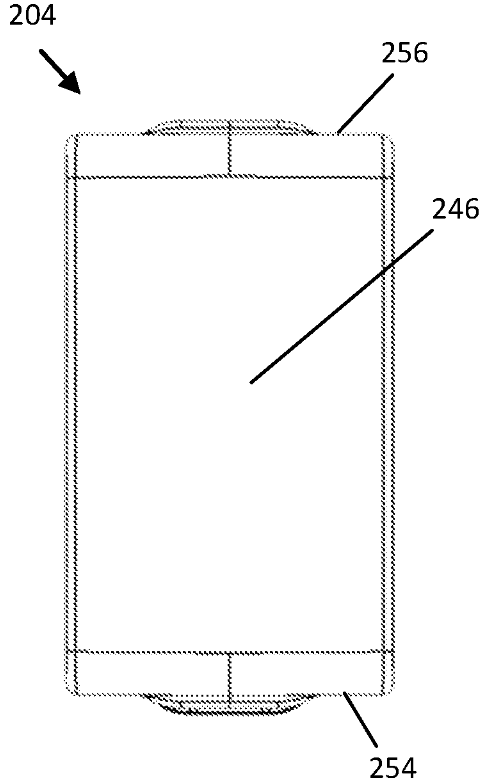
FIG. 33 illustrates a rear view of an example key container.
Figure 34:
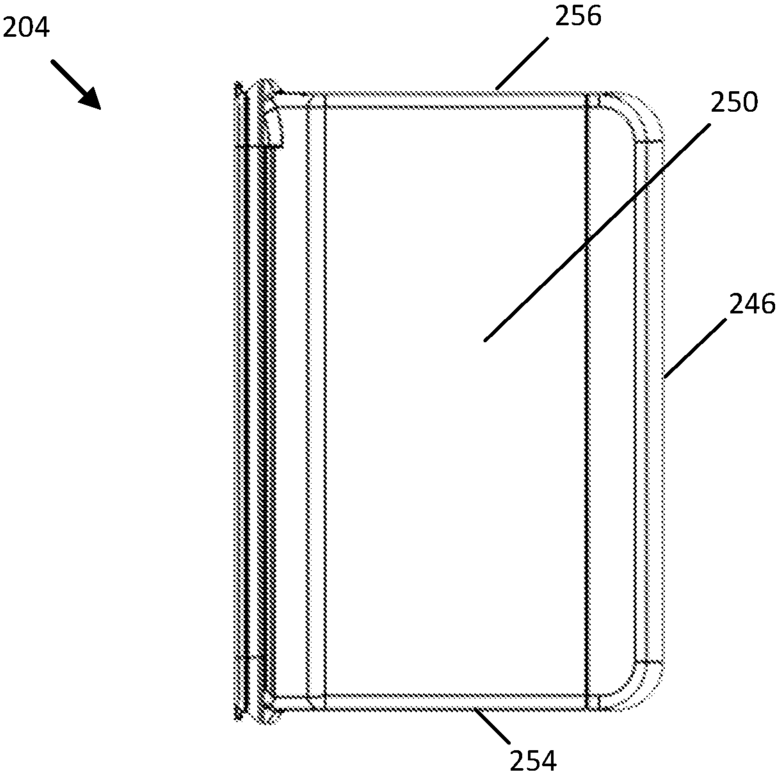
FIG. 34 illustrates a left side view of a key container; a right side view of the example key container is substantially a mirror image.
Figure 35:
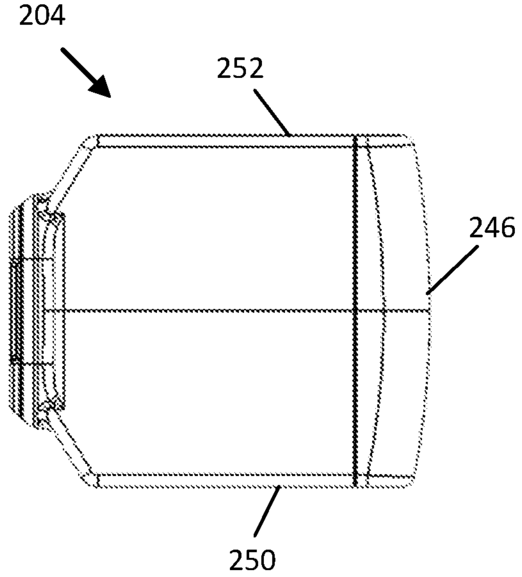
FIG. 35 illustrates a top view of an example key container.
Figure 36:
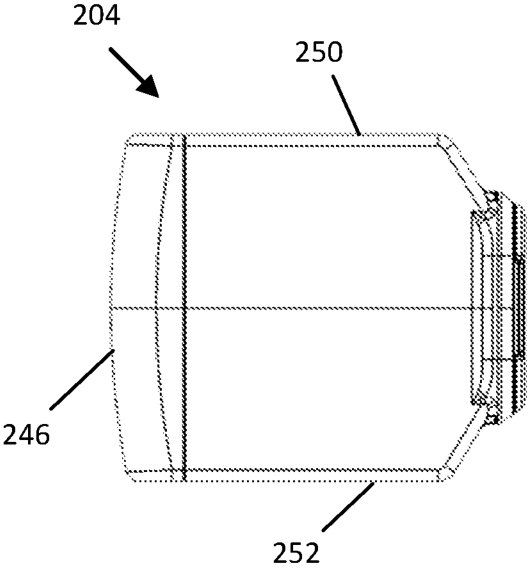
FIG. 36 illustrates a bottom view of an example key container.

FIG. 24 shows another alternative example of a container arrangement 800. This example is similar to the container arrangement 700, and shows that a series or strip 810 of adapters 808 may be used to hold pairs of key containers 804. In this example, the plurality of adapters 808 are connected.

FIGS. 25-30 show perspective, front, rear, side, top, and bottom views, respectively, of a sector container 202. The sector container 202 includes a body 220 that has an exterior surface and an interior surface that define a hollow core 222 (depicted in FIG. 37). The core 222 has a volume V1 (shown in FIG. 37) that can be filled with a sample such as a solution of cell cultures, algae, etc.

The sector container 202 includes a cap 224 that can be opened for providing access to the core 222, and that can be closed for sealing the core 222. In the example shown in FIGS. 25-30, the cap 224 is integral with the body 220 such that the cap 224 and the body 220 are one piece. In such examples, the cap 224 pivots about a hinge 225 for opening and closing the core 222. In other examples, the cap 224 is a component separate from the body 220. In such examples, the cap 224 can be attached and detached from the body 220 for opening and closing the core 222.

Still referring to FIGS. 25-30, the sector container 202 includes a rear surface 226, a front surface 228, side surfaces 230, 232, a bottom surface 234, and a top surface 236. The sector container 202 has a wedge shape such that a width of the rear surface 226 of the container is larger than a width of the front surface 228 of the container. The side surfaces 230, 232 are not parallel with one another and define wedge angle θ. A height H3 of the sector container 202 (shown in FIG. 27) is defined between the bottom surface 234 and the top surface 236 of the container. The sector container 202 further includes a depth DO (shown in FIG. 29) that is defined between the rear surface 226 and the front surface 228. The front surface 228, the bottom surface 234, and the top surface 236 of the sector container 202 are substantially flat, whereas the rear surface 226 is curved for matching the curved shape of the inside surface of sidewall 127.

In some examples, the wedge angle θ of the sector container 202 is in a range from 60 degrees to 20 degrees, and in other examples the wedge angle θ of the sector container 202 is in a range from 45 degrees to 25 degrees. In some examples, the height H3 of the sector container 202 is in a range from 4 inches to 8 inches, and in other examples the height H3 of the sector container 202 is in a range from 5 inches to 7 inches. In some examples, the depth DO of the sector container 202 is in a range from 2.5 inches to 4.5 inches, and in other examples, the depth DO of the sector container 202 is in a range from 3 inches to 4 inches. In some examples, the volume V1 of the hollow core 222 of the sector container 202 is in a range from 1 liter to 2 liters, and in other examples the volume V1 of the hollow core 222 is in a range from 1 liter to 1.5 liters.

FIGS. 31-36 show perspective, front, rear, side, top, and bottom views, respectively, of a key container 204. The key container 204 includes a body 240 having an exterior surface and an interior surface that define a hollow core 227 (depicted in FIG. 38). The core 227 of the key container 204 has a volume V2. In some examples, the core 227 can be filled with a sample such as a solution of cell cultures, algae, etc.

In other examples, the core 227 of the key container 204 is not filled with a sample. Instead, the core 227 may be filled with a fluid to remove weight imbalances between the key container 204 and the sector containers 202 when arranged together in a container arrangement, such as the container arrangement 200 shown in FIG. 18.

The key container 204 includes a cap 242 that can be opened for providing access to the core 227, and that can be closed for sealing the core. In the example shown in FIGS. 31-36, the cap 242 is integral with the body 240 such that the cap 242 and the body 240 are one piece. In such examples, the cap 242 pivots about a hinge 244 for opening and closing the core 227. In other examples, the cap 242 is a component separate from the body 240 that can be attached and detached from the body 240.

Still referring to FIGS. 31-36, the key container 204 includes a rear surface 246, a front surface 248, side surfaces 250, 252, a bottom surface 254, and a top surface 256. The key container 204 has a substantially rectangular prism shape such that a width of the rear and front surfaces 246, 248 of the key container 204 are substantially the same, and the side surfaces 250, 252 are substantially parallel with one another. The bottom and top surfaces 254, 256 of the key container 204 are substantially flat, whereas the rear surface 246 is curved for matching the shape of the sidewall 127.

The sector container 202 and key container 204 are made from a flexible and lightweight material to allow easy loading and unloading of the containers into and out of the rotor, while allowing the containers to withstand the radial accelerations and the high hydrostatic pressures generated inside the respective cores 222, 227 of these container during centrifugation. In certain examples, the sector container 202 and the key container 204 are made from a plastic material such as, for example, glass filled polypropylene, and other similar types of plastics.

The sector container 202 and the key container 204 are each made from plastic parts that are injection molded and bonded together. The injection molded parts simplify the construction of the sector container 202 and the key container 204. The injection molded parts also strengthen the sector container 202 and the key container 204 so that these containers can withstand the radial accelerations and hydrostatic forces generated within their cores during centrifugation.

Figure 37:
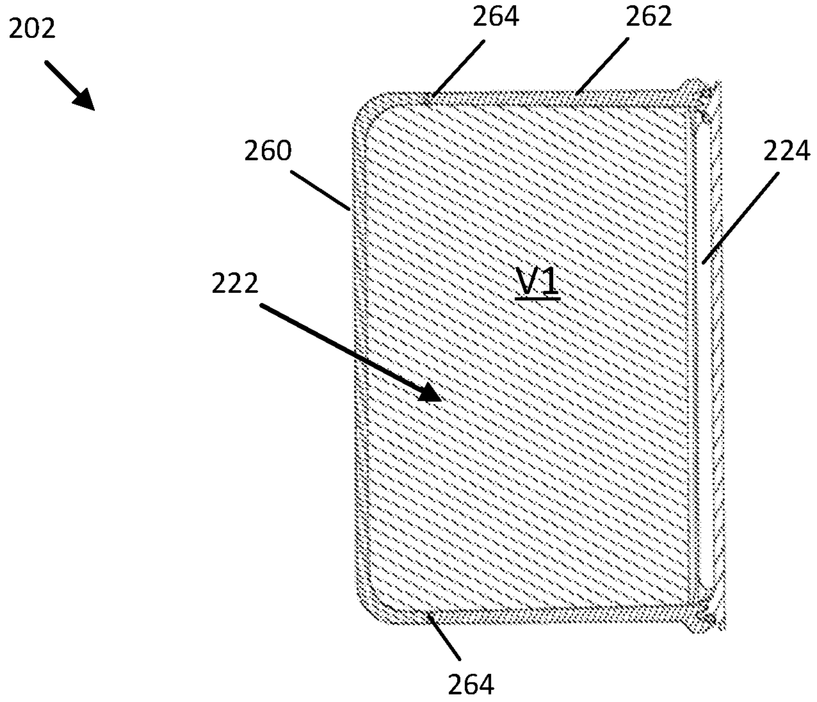
FIG. 37 illustrates a cross-sectional side view of an example sector container.

FIG. 37 shows a cross-sectional side view of the sector container 202. The sector container 202 includes a rear injection molded part 260 and a front injection molded part 262. The rear part 260 and the front part 262 are bonded together at a joint 264. In some examples, the rear and front parts 260, 262 are bonded together by melting opposing edges of the rear and front parts 260, 262 and pushing the parts together for forming a melted bond at the joint 264. In other examples, the rear and front parts 260, 262 are bonded together at the joint 264 by ultra-sonic welding. Additionally, other bonding techniques may be used for bonding the rear and front parts 260, 262 together.

Figure 38:
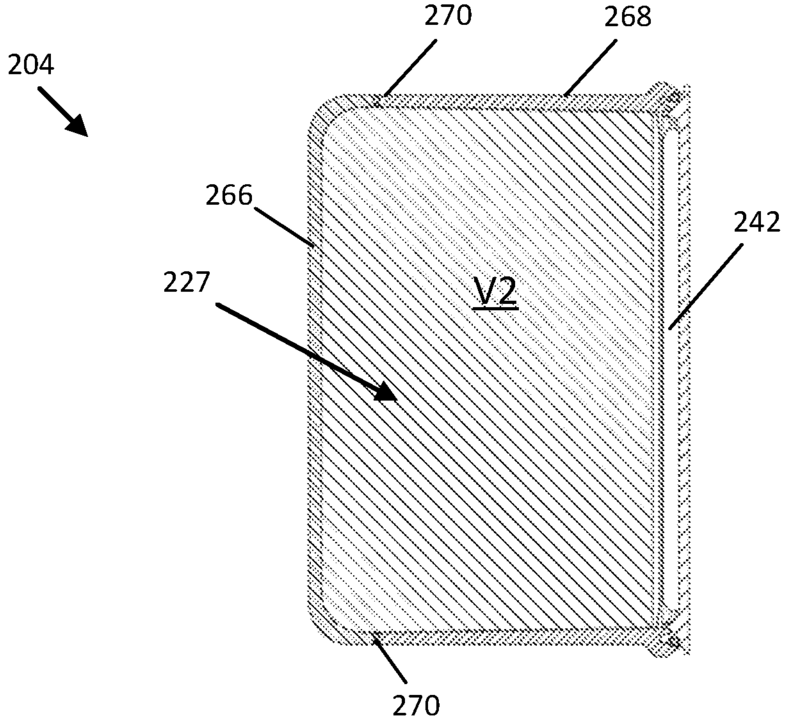
FIG. 38 illustrates a cross-sectional side view of an example key container.

FIG. 38 shows a cross-sectional side view of the key container 204. The key container 204 also includes rear and front injection molded parts 266, 268 bonded together at a joint 270. The joint 270 has a similar location as the joint 264 of the sector container 202. The rear and front parts 266, 268 of the key container 204 may be bonded together by melting opposing edges of the rear and front parts 266, 268 and pushing the parts together, by ultra-sonic welding, and by other bonding techniques.

The location of the joints 264, 270 in the sector container 202 and the key container 204, respectively, is advantageous because the loads generated during centrifugation of the containers will compress the joints 264, 270 instead of tearing them apart. The location of the joints 264, 270 increases the structural integrity of the sector container 202 and the key container 204 allowing them to withstand the strong hydrostatic forces generated within their respective cores during centrifugation. For example, the sector container 202 and the key container 204 may withstand hydrostatic pressures generated when rotor rotates at radial accelerations exceeding 15000×G.

Figure 39:
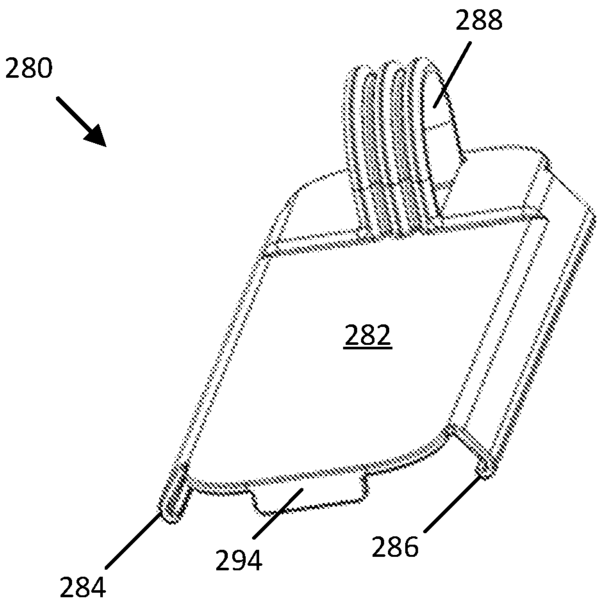
FIG. 39 illustrates a perspective view of an example lid.

FIG. 39 shows a bottom perspective view of a lid 280. The lid 280 may be used with both the sector container 202 and the key container 204. The lid 280 includes a base 282. Rails 284, 286 extend lengthwise on opposing sides of the base 282. The lid 280 also includes a stop 294 located at the bottom of the base 282. The lid 280 may further include a ring 288 that can ease the transporting and installation of the sector container 202 and the key containers 204 when the lid 280 is installed thereon.

Figure 40:
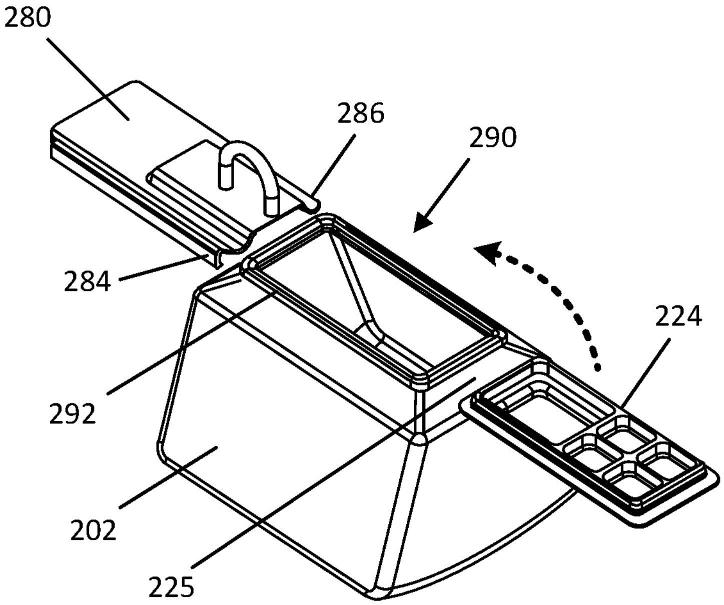
FIG. 40 illustrates a perspective view of an example sector container having a cap in an open position.
Figure 41:
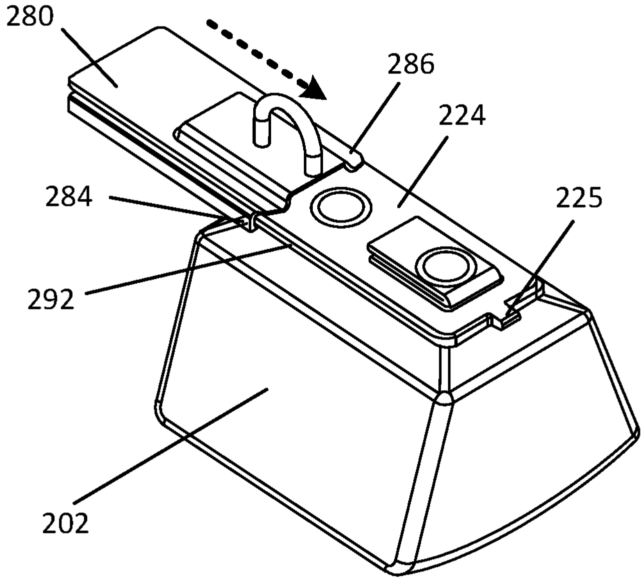
FIG. 41 illustrates a perspective view of an example sector container having a cap in a closed position.
Figure 42:
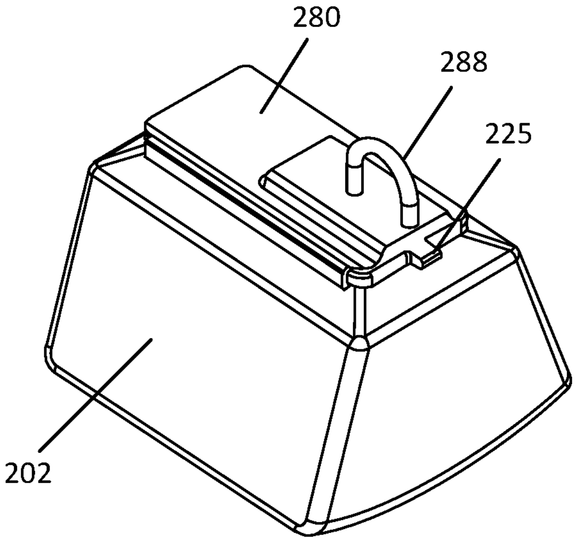
FIG. 42 illustrates a perspective view of an example sector container having a cap in a closed position and a lid sealing the cap.

The following description will describe the application of the lid 280 to the sector container 202 depicted in FIGS. 40-42; however the lid 280 may also be applied to the key container 204 in a similar fashion and thus the following description is not limited to the sector container 202, but may also be applicable to key container 204.

FIG. 40 shows a perspective view of a sector container 202 in an open position. In the open position, the cap 224 is pivoted about the hinge 225 for exposing an opening 290 of the sector container. The opening 290 is generally rectangular in shape and faces inward when installed in the rotor. The opening 290 is surrounded by a lip 292. In the open position, the sector container 202 may be filled with a sample. After the sector container 202 has been filled with a sample, the cap 224 can be pivoted about the hinge 225 as indicated by the arrow for sealing the opening of the sector container 202.

FIG. 41 shows the sector container 202 in a closed position. In the closed position, the cap 224 is engaged with the lip 292 for sealing the opening of the sector container and thereby securing the sample inside the sector container. In certain examples, the cap 224 can be press fitted into the lip 292 for sealing the sector container.

Still referring to FIG. 41, the rails 284, 286 of the lid 280 are adapted to engage the lip 292 when the sector container 202 is in the closed position. The rails are able to slide along the lip 292 of the sector container 202. As the lid 280 slides with respect to the lip 292, the lid 280 further compresses the cap 224 into the lip 292 for enhancing the seal around the opening of the sector container 202. Also, the lid 280 may have an additional sealing feature or part such as an O-ring to enhance the seal around the opening of the sector container 202. The lid 280 is slidable along the lip 292 until the stop 294 of the lid 280 engages a bottom of the lip 292.

In some examples, the body 220 of the sector container 202 may include shoulders 296 (shown in FIGS. 25 and 26) located on opposite sides of the opening 290. The shoulders 296 may prevent the lid 280 from sliding further with respect to the lip 292 of the sector container by engaging the rails 284 and 286 of the lid 280.

FIG. 42 shows the lid 280 fully engaged around the cap 224 of the sector container 202 such that the stop 294 of the lid has engaged the bottom of the lip 292. In this position, the lid 280 prevents the cap 224 from pivoting about the hinge 225 and thereby opening. Thus, the lid 280 enhances the security of the sector container 202. Also, the ring 288 of the lid 280 improves the handling of the sector container 202 by allowing a technician to slip their finger through the ring 288 when transporting the sector container 202. Thus, the lid 280 can ease the handling of the sector container 202 during the installation of the sector container into the rotor, and its removal therefrom.

Figure 43:
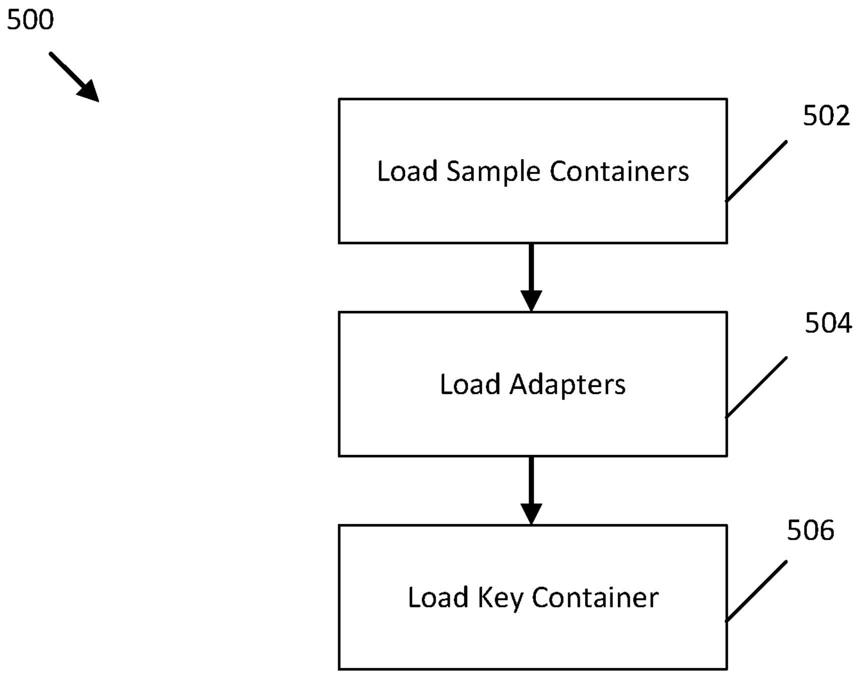
FIG. 43 illustrates a method of loading containers into a centrifuge.

FIG. 43 illustrates a method 500 of loading samples into a centrifuge rotor, such as the rotor 110 shown in FIG. 2. The method 500 includes a step 502 of loading one or more sample containers inside an annulus cavity of the centrifuge rotor. In certain examples, the one or more sample containers are similar to the sector containers 202*a*-202*h* in FIG. 18. The annulus cavity is similar to the annulus cavity 122 depicted in FIGS. 7 and 8, and is accessed through an opening such as the opening 131.

Next, the method 500 includes a step 504 of loading adapters inside the annulus cavity. In some examples, the adapters are wedge shaped and are loaded next to the sample containers. In certain examples, the one more adapters may be similar to the adapters 206*a*, 206*b* depicted in FIG. 18.

Next, the method includes a further step 506 of loading a key container inside the annulus cavity. In some examples, the key container has parallel side surfaces and is substantially similar to the key containers 204*a*, 204*b* in FIG. 18. In the method 500, the key container is the last container loaded into the centrifuge rotor.

In certain examples, the method 500 may also include a step of loading a key container into the centrifuge rotor before loading the one or more sample containers inside an annulus cavity of the centrifuge rotor. In these examples, a key container is both the first container and the last container loaded inside the centrifuge rotor.

In some alternative examples, the method 500 may include a step of loading one or more sample containers of a second type, such as the transition containers 308 depicted in FIG. 20. In these alternative examples, a key container is still the last container loaded into the centrifuge rotor.

In another alternative example, the method 500 may not include loading the adapters inside the annulus cavity. Instead, only key containers and sample containers are loaded inside the annulus cavity such that the key and sample containers are arranged in an alternating pattern, such as the container arrangement 400 shown in FIG. 21.

The method 500 may include an initial step of filling the one or more sample containers with one or more samples by laying each container horizontally and facing upward, and opening a cap for filling a hollow core of each sample container with a sample. The cap can be closed for sealing the core with the sample container therein. A lid can be slid over the cap for preventing the cap from accidentally opening. In some examples, the lid may include a ring for handling the one or more sample containers.

In some examples, the one or more sample containers are filled with the same type of sample. In other examples, the one or more sample containers are filled with different types of samples. In certain examples, the one or more sample containers are each filled with the same volume of sample to balance the hydrostatic pressures between the sample containers during the spinning of the centrifuge rotor. In some instances, adapters can be used that will allow the one more sample containers to be filled with different sample volumes. The method 500 may include another initial step of filling the one or more key containers with a sample. The one or more key containers can be filled in substantially the same manner as described above with respect to filling the one or more sample containers.

In some examples, the one or more key containers are filled with the same type of sample filled in the one or more sample containers. In other examples, a different sample or no sample is filled in the one or more key containers.

The method 500 may include a step of attaching a removable cover for sealing the annulus cavity with the one or more key containers, the adapters, and the one or more sample containers constrained therein. Thereafter, the method 500 may include a further step of mounting the centrifuge rotor inside a centrifuge.

Figure 44:
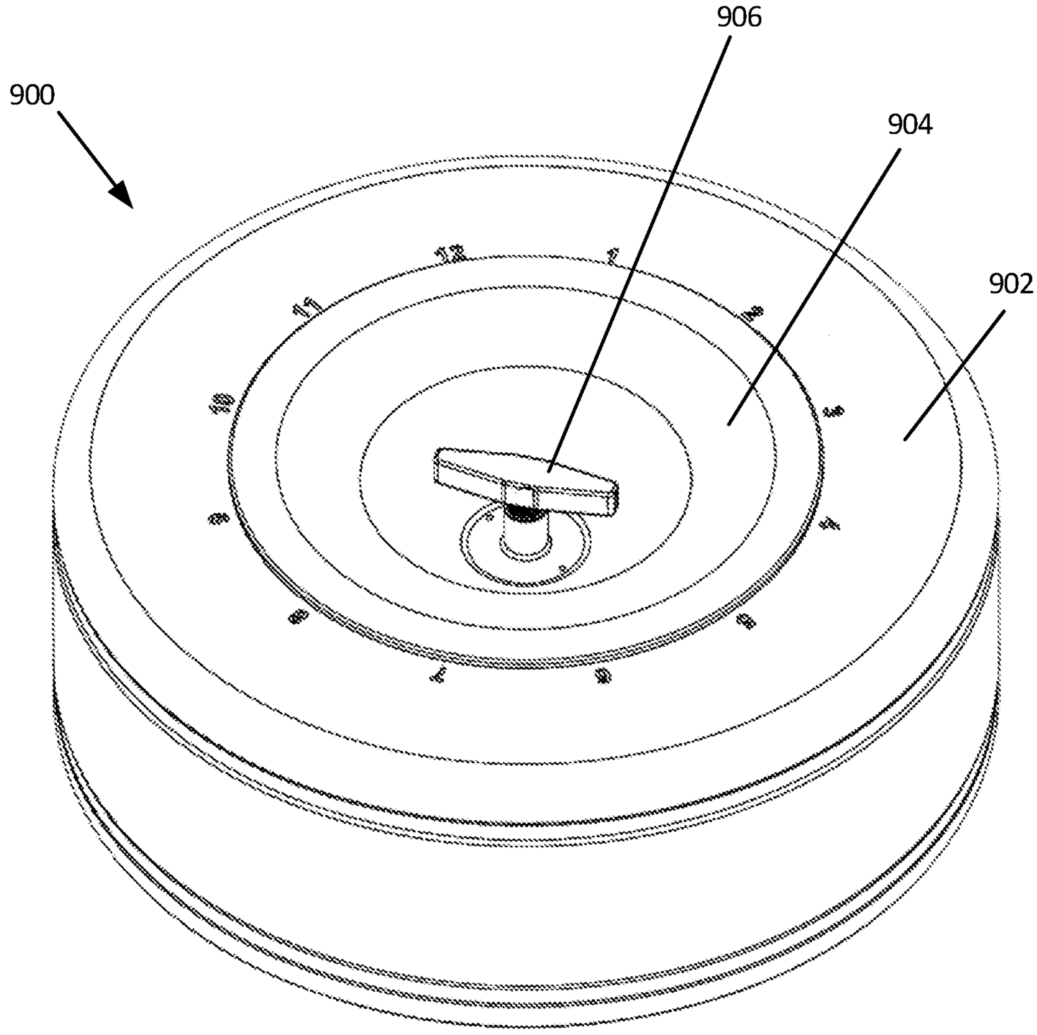
FIG. 44 illustrates a perspective view of another example rotor.

FIG. 44 illustrates a perspective view of another example rotor 900. The rotor 900 is configured to separate a range of sample volumes from 2 L up to 12 L in a compact centrifuge with high efficiency (e.g., k-factors lower than 2350) and at high radial acceleration (e.g., greater than 15,000×G).

As shown in FIG. 44, the rotor 900 includes a rotor body 902 and a cover 904. A tie-down bolt 906 is used to removably attach the cover 904 to the rotor body 902. The rotor 900 is mountable inside the enclosed chamber 104 of the centrifuge 100 of FIG. 1.

Figure 45:
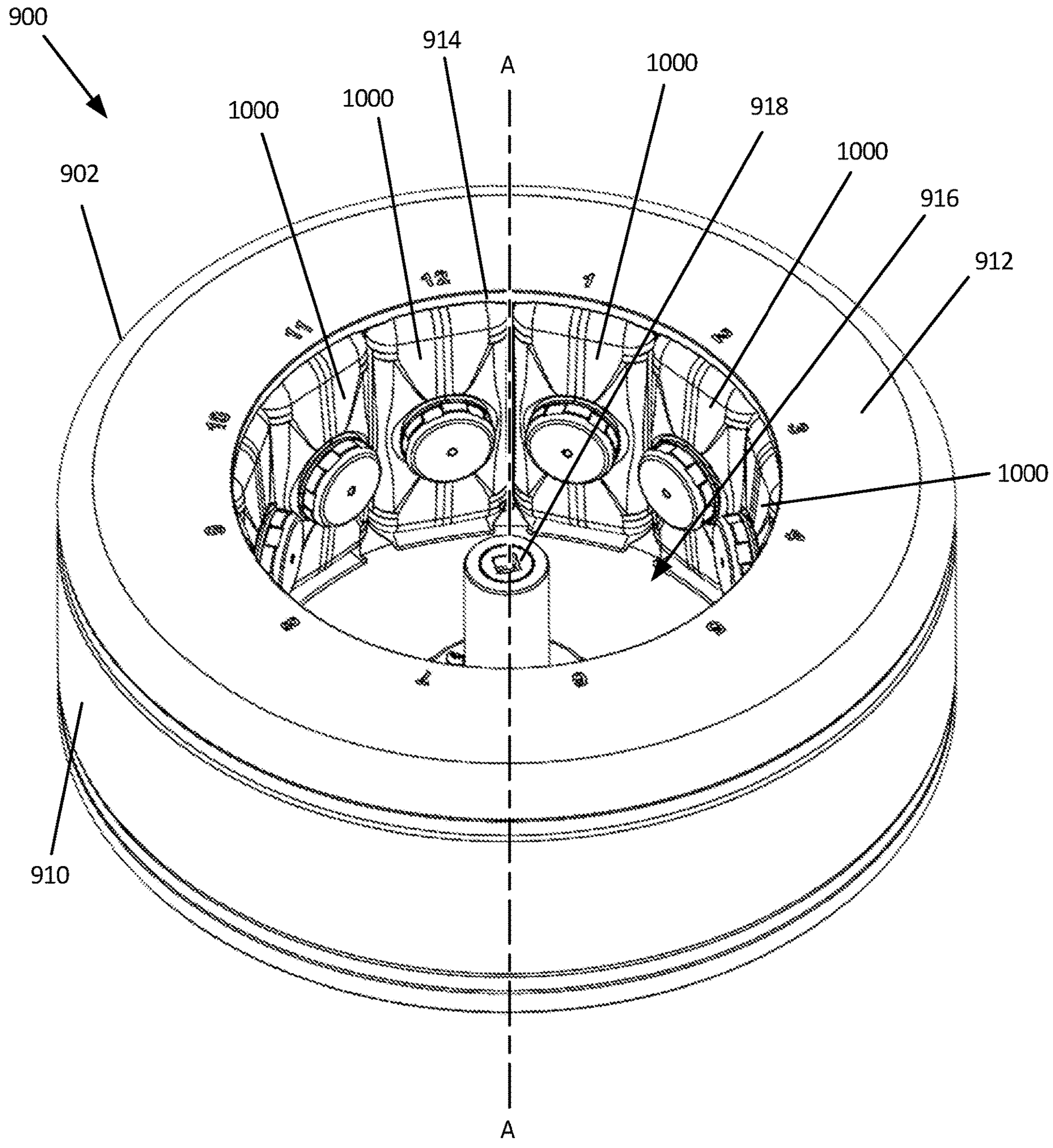
FIG. 45 illustrates a perspective view of the rotor of FIG. 44, the rotor is shown with a cover removed exposing sample containers loaded inside the rotor.

FIG. 45 illustrates a perspective view of the rotor 900 with the cover 904 removed from the rotor body 902. The rotor body 902 includes a base 908, a sidewall 910, and a top 912. A drive hub 918 extends from the base 908 and is configured to receive a drive shaft of a centrifuge motor (e.g., see FIG. 16). The top 912 includes an opening 914 that provides access to an annulus cavity 916. The cover 904 is removably attachable to the drive hub 918 for sealing the opening 914 of the annulus cavity 916 and fixing the rotor body 902 to the drive shaft of the centrifuge motor.

The base 908, sidewall 910, and top 912 define the shape of the annulus cavity 916. The annulus cavity 916 is configured to constrain a plurality of sample containers 1000 such that the sample containers 1000 are distributed about the rotational axis A-A of the rotor 900. As shown in FIG. 45, the sample containers 1000 are slotted against an interior circumference of the sidewall 910 and between the base 908 and the top 912, and the sample containers 1000 are spaced in a radial direction away from the drive hub 918.

Figure 46:
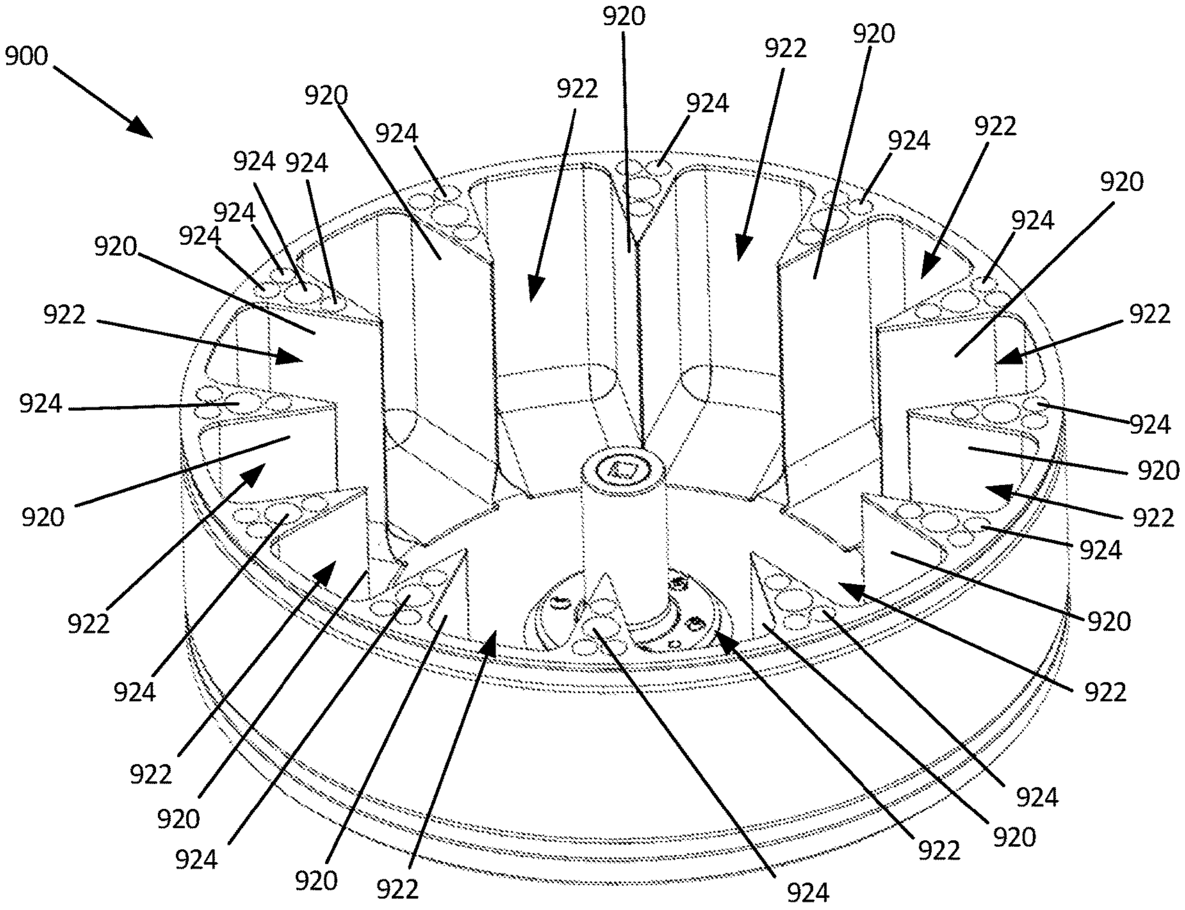
FIG. 46 illustrates a cross-sectional perspective view of the rotor of FIG. 44 along a horizontal plane, the rotor is shown without the sample containers loaded therein.
Figure 47:
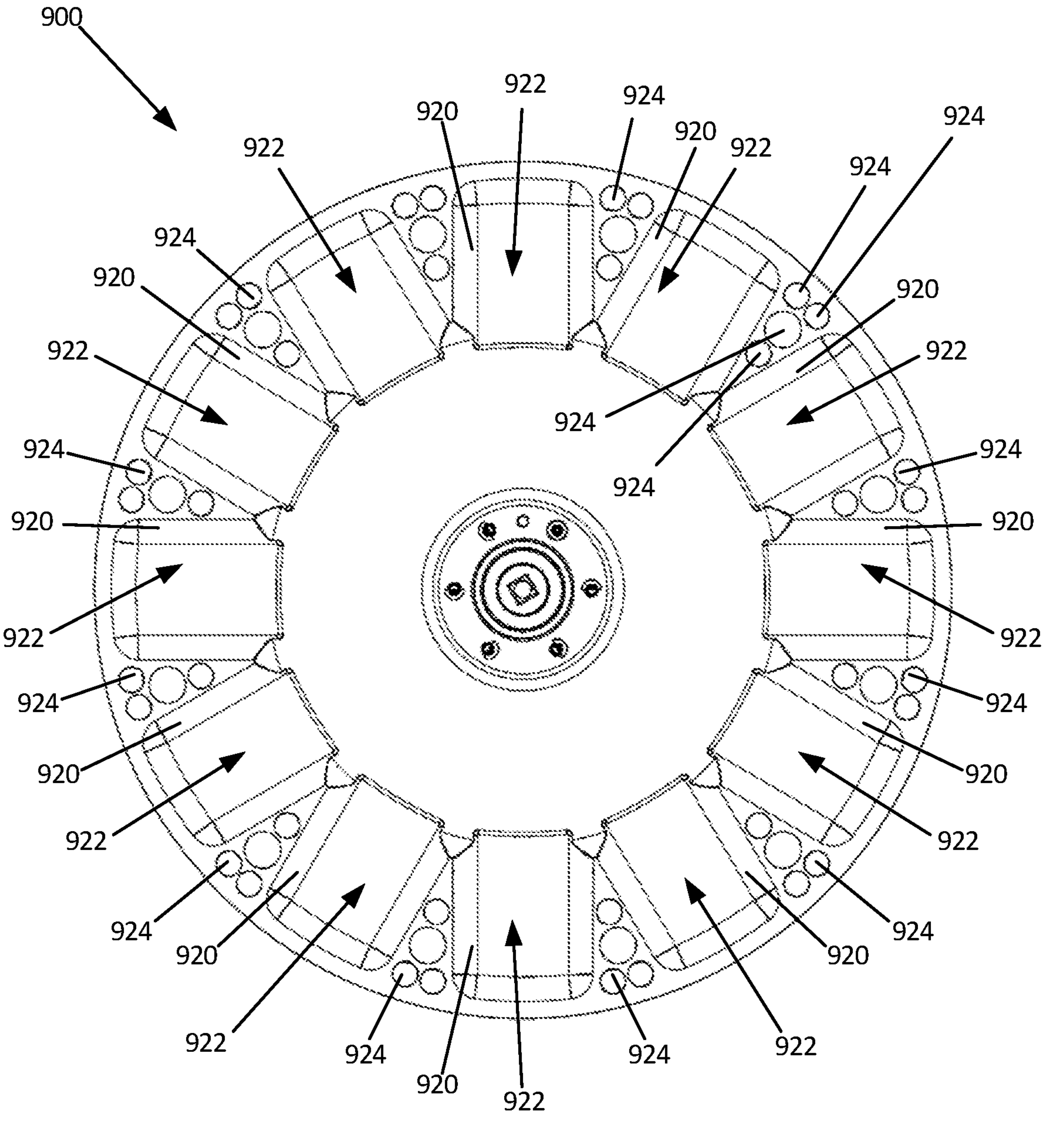
FIG. 47 illustrates a cross-sectional top view of the rotor of FIG. 44 along the horizontal plane, the rotor is shown without the sample containers loaded therein.

FIGS. 46 and 47 illustrate cross-sectional views of the rotor 900 along a horizontal plane. Referring now to FIGS. 45-47, the rotor body 902 includes a plurality of supports 920 equally spaced around the rotational axis A-A of the rotor body 902. Each support 920 extends from the base 908 to the top 912 of the rotor body 902, and extends in a radial direction from an interior circumference of the sidewall 910 toward the rotational axis A-A of the rotor body 902. Each support 920 has side surfaces that converge toward the rotational axis A-A providing each support 920 with a substantially wedge shape. Pairs of adjacent supports 920 define a slotted area 922 that is configured to receive a sample container 1000 inside the annulus cavity 916 of the rotor body 902. Accordingly, the rotor body 902 constrains the sample containers 1000 inside the annulus cavity 916 between the base 908, sidewall 910, top 912, and pairs of adjacent supports 920 when the sample containers 1000 are advanced radially against the sidewall 910.

The supports 920 are integrally formed with the rotor body 902 such that the base 908, sidewall 910, top 912, and supports 920 are formed from a single piece of material. In one example, the rotor body 902 is molded such that it is a single piece of material. In another example, the rotor body 902 is shaped using a lathe or other similar type of machinery such that it is shaped from a single piece of material.

In the example shown in FIGS. 46 and 47, the rotor body 902 includes 12 supports 920 that define 12 slotted areas 922 for receiving 12 sample containers 1000 inside the annulus cavity 916. The number of supports 920 in the rotor body 902 may vary as needed such that the rotor body 902 can include more or fewer than 12 dividers.

Figure 48:
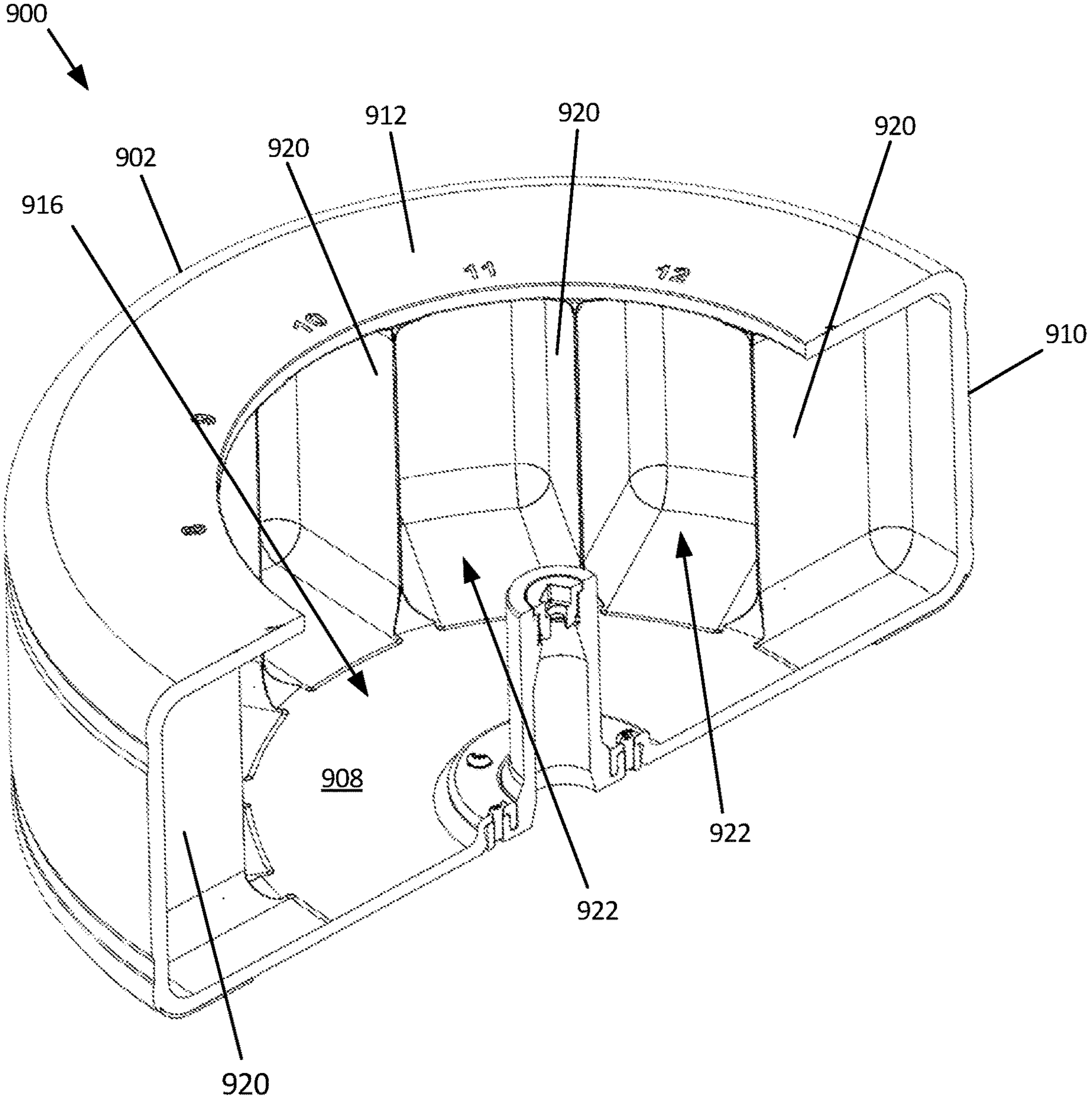
FIG. 48 illustrates a cross-sectional perspective view of the rotor of FIG. 44 along a vertical plane, the rotor is shown without the sample containers loaded therein.
Figure 49:
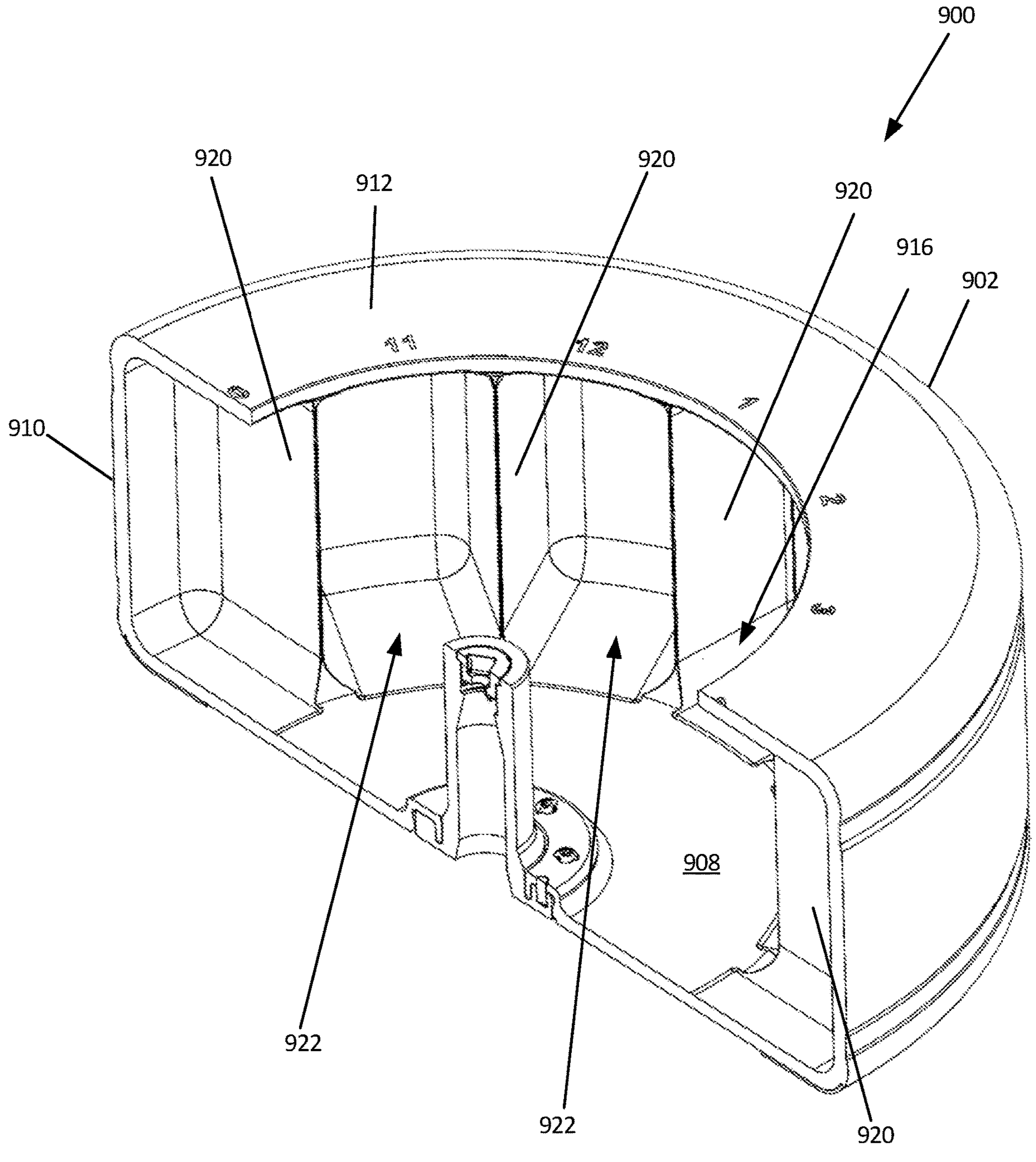
FIG. 49 illustrates another cross-sectional perspective view of the rotor of FIG. 44 along the vertical plane, the rotor is shown without the sample containers.
Figure 50:
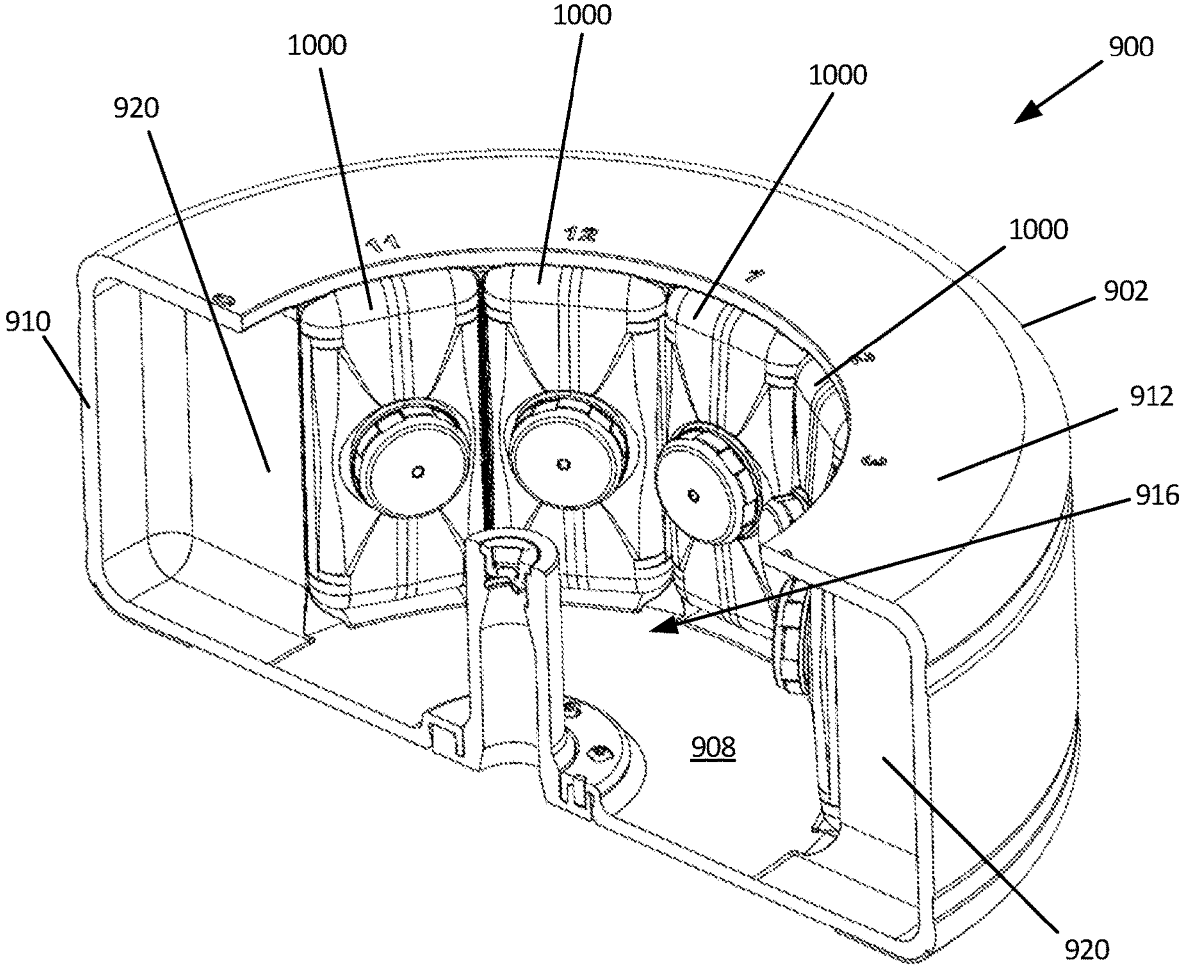
FIG. 50 illustrates a cross-sectional perspective view of the rotor of FIG. 44 along the vertical plane, the rotor is shown partially loaded with sample containers.
Figure 51:
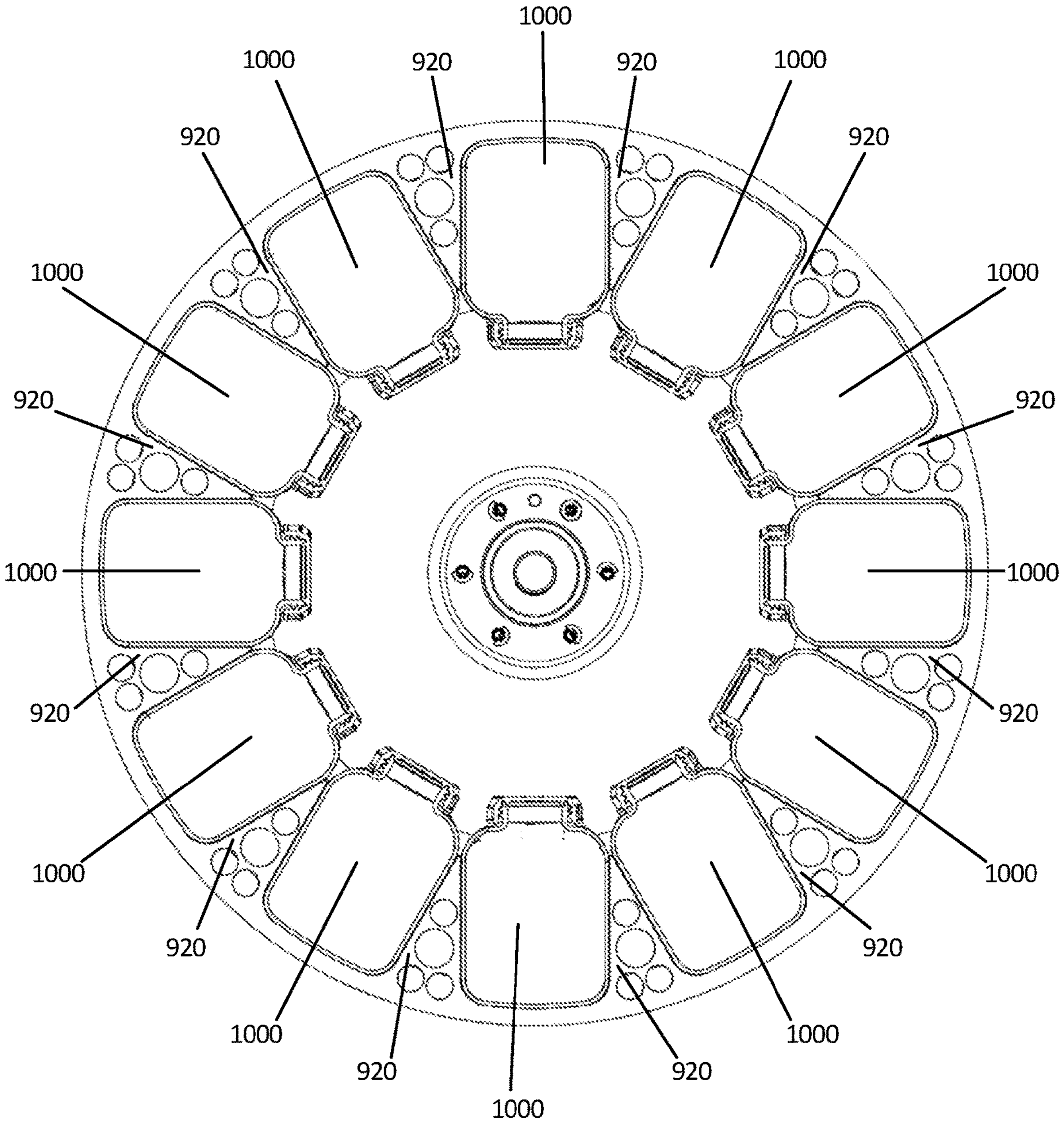
FIG. 51 illustrates a cross-sectional top view of the rotor of FIG. 44 along the horizontal plane, the rotor is shown loaded with sample containers.

FIGS. 48 and 49 illustrate cross-sectional views of the rotor 900 along a vertical plane without the sample containers 1000 loaded inside the annulus cavity 916. FIG. 50 illustrate a cross-sectional view of the rotor 900 along a vertical plane with the annulus cavity 916 partially loaded with the sample containers 1000. FIG. 51 illustrates a cross-sectional view of the rotor 900 along a horizontal plane with the annulus cavity 916 loaded with the sample containers 1000. Referring now to FIGS. 48-51, each slotted area 922 is shaped such that the supports 920 support the side surfaces of each sample container 1000, the interior circumference of the sidewall 910 supports the rear surface of each sample container 1000, the base 908 supports the bottom surface of each sample container 1000, and the top 912 supports the top surface of each sample container 1000.

The supports 920 oppose the loads from the sample containers 1000 during centrifugation which prevents failures of the sample containers 1000 when rotated at radial accelerations exceeding 15000×G inside the centrifuge 100. Advantageously, if one sample container 1000 fails during centrifugation, the other sample containers 1000 will not also fail because each sample container 1000 is independently supported within the annulus cavity 916 by the supports 920, base 908, sidewall 910, and top 912.

Additionally, less than a full complement of sample containers 1000 can be loaded into the rotor 900 for centrifugation so long as the weight of the sample containers 1000 is evenly distributed along the interior circumference of the sidewall 910. Thus, fewer than 12 sample containers 1000 can be loaded inside the annulus cavity 916 even though the annulus cavity 916 provides 12 slotted areas 922.

Another advantage of the rotor 900 is that the supports 920 and corresponding slotted areas 922 permit a single type of sample container 1000 (e.g., having a uniform shape and size) for use with the rotor 900. Thus, the rotor 900 is easy to load because different shaped sample containers are not needed to fill the annulus cavity 916.

Referring back to FIGS. 46 and 47, each support 920 includes one or more internal cavities 924 that extend from the top 912 to the base 908 of the rotor body 902. Each support 920 includes at least one internal cavity 924, and can include two, three, four, or more internal cavities 924. The internal cavities 924 in each support 920 are hollow, and thereby reduce the weight of the rotor body 902.

Additionally, the structural support provided from the supports 920 permits the thickness of the sidewall 910 of the rotor body 902 to be thinner. This reduces the weight of the rotor body 902, and also concentrates the mass of the rotor body 902 toward the rotational axis A-A of the rotor body 902. Advantageously, by concentrating the mass of the rotor body 902 toward the rotational axis A-A of the rotor body 902, the inertia of the rotor body 902 is reduced, and this allows the rotor 900 to reach maximum radial accelerations with less power consumption from the centrifuge motor. Also, concentrating the mass of the rotor body 902 toward the rotational axis A-A reduces the amount of kinetic energy that must be contained in the event of rotor failure.

Figure 52:
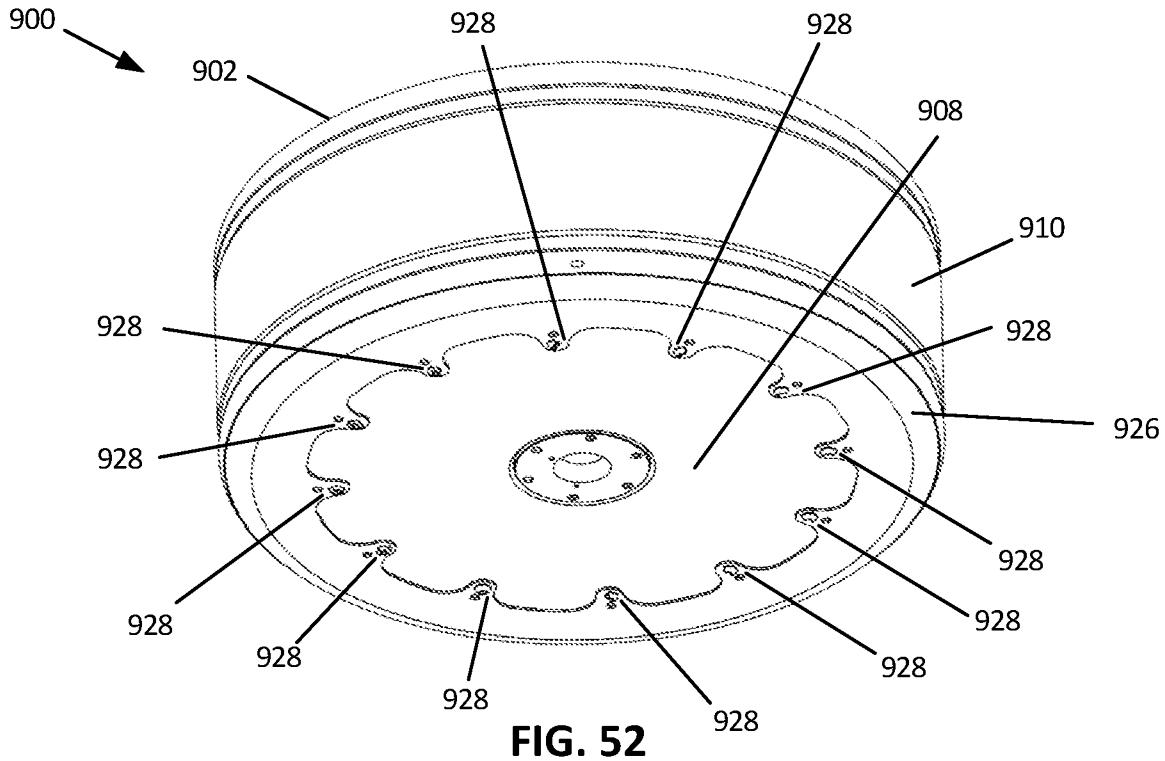
FIG. 52 illustrates a bottom perspective view of the rotor of FIG. 44.
Figure 53:
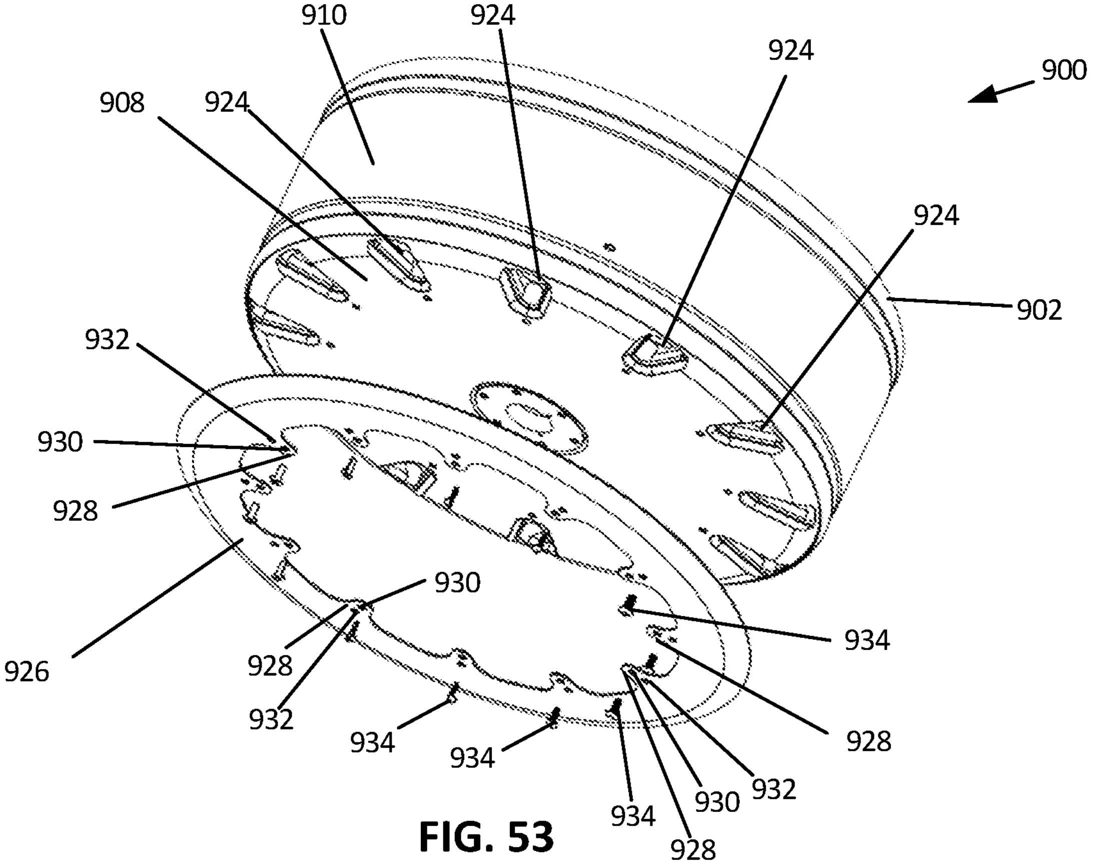
FIG. 53 illustrates an exploded bottom view of the rotor of FIG. 44.
Figure 54:
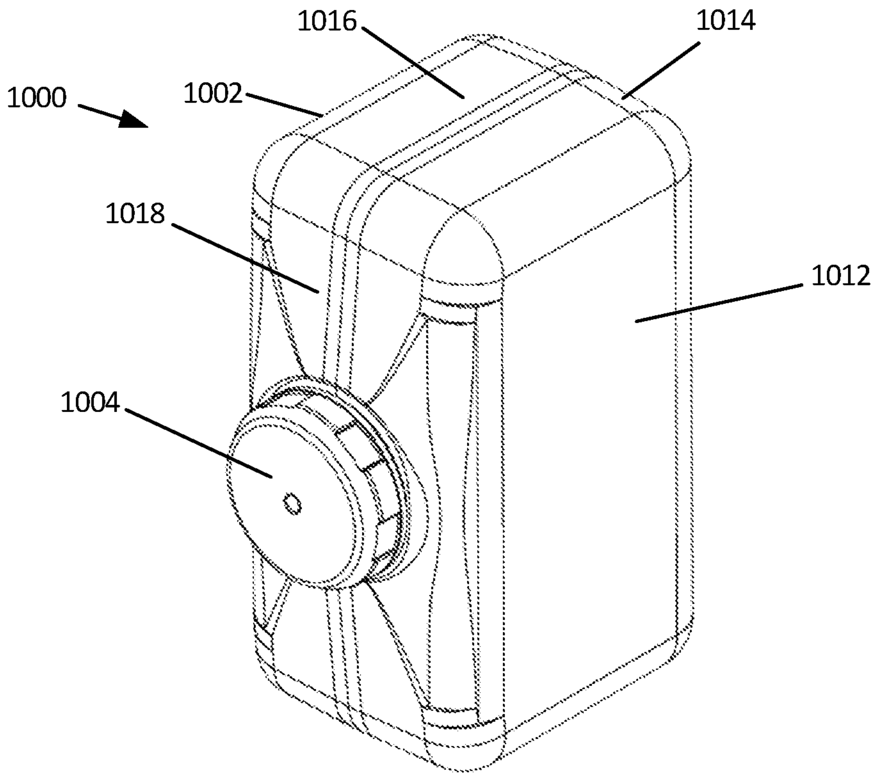
FIG. 54 illustrates a perspective view of a sample container.

FIG. 52 illustrates a bottom perspective view of the rotor 900. FIG. 53 illustrates an exploded bottom perspective view of the rotor 900. As shown in FIGS. 52 and 53, the rotor 900 includes a windshield 926 that attaches to the base 908. The internal cavities 924 in each support 920 extend through the base 908, and the windshield 926 partially covers the internal cavities 924 of each support 920. Advantageously, the windshield 926 mitigates heating at the internal cavities 924 during centrifugation.

In the depicted example, the windshield 926 includes webbed tips 928 that each extend toward the rotational axis A-A of the rotor 900. Each webbed tip 928 aligns with a support 920 so that the webbed tips 928 cover the internal cavities 924 of the supports 920. Each webbed tip 928 includes a first aperture 930 for receiving a fixture 934 such as a screw for securing the windshield 926 to the base 908 and a second aperture 932 that provides an outlet for the internal cavities 924 of each support 920. Advantageously, the second apertures 932 provide drainage to allow fluid to discharge from the internal cavities 924 of the rotor 900 such as when the rotor is being washed.

FIGS. 54-60 illustrate perspective, exploded, side, front, rear, top, and bottom views, respectively of a sample container 1000. Each sample container 1000 includes a body 1002 that defines an internal cavity 1006 for containing a sample. The body 1002 has a shape defined by a bottom wall 1010, sidewalls 1012, rear wall 1014, top wall 1016, and front wall 1018. The shape of the body 1002 corresponds to the shape of the slotted areas 922 that are defined between adjacent supports 920, and the base 908, sidewall 910, and top 912 of the rotor 900. In one example, the body 1002 of each sample container 1000 has a substantially rectangular prism shape with rounded edges.

Figure 55:
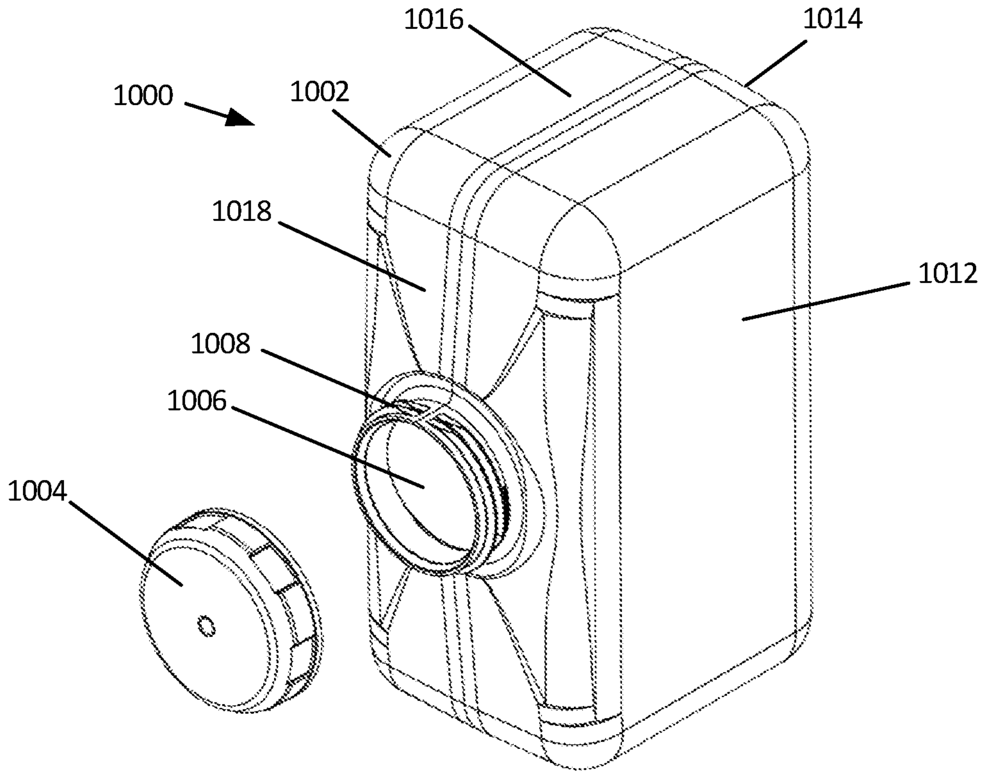
FIG. 55 illustrates an exploded view of the sample container.
Figure 56:
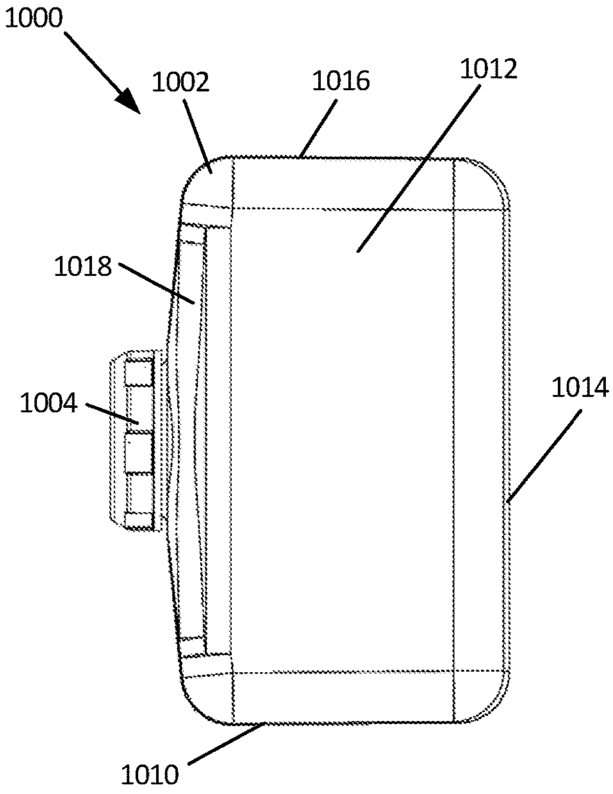
FIG. 56 illustrates a side view of the sample container.
Figure 57:
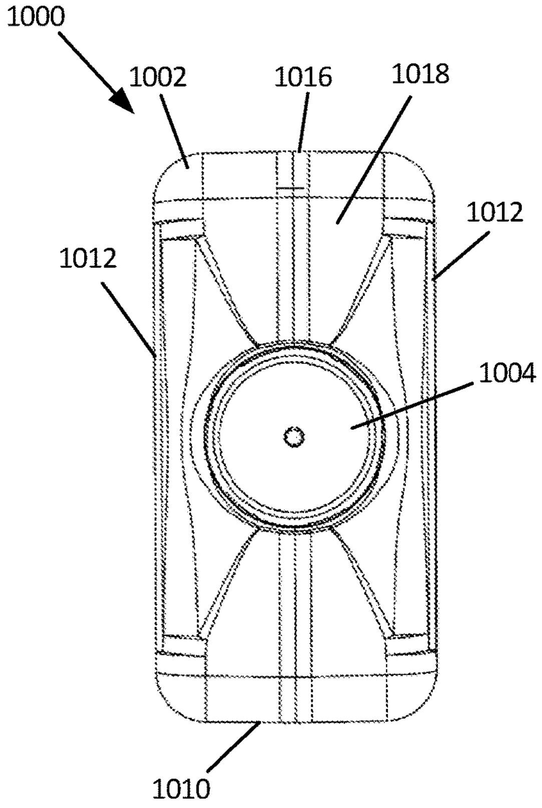
FIG. 57 illustrates a front view of the sample container.
Figure 58:
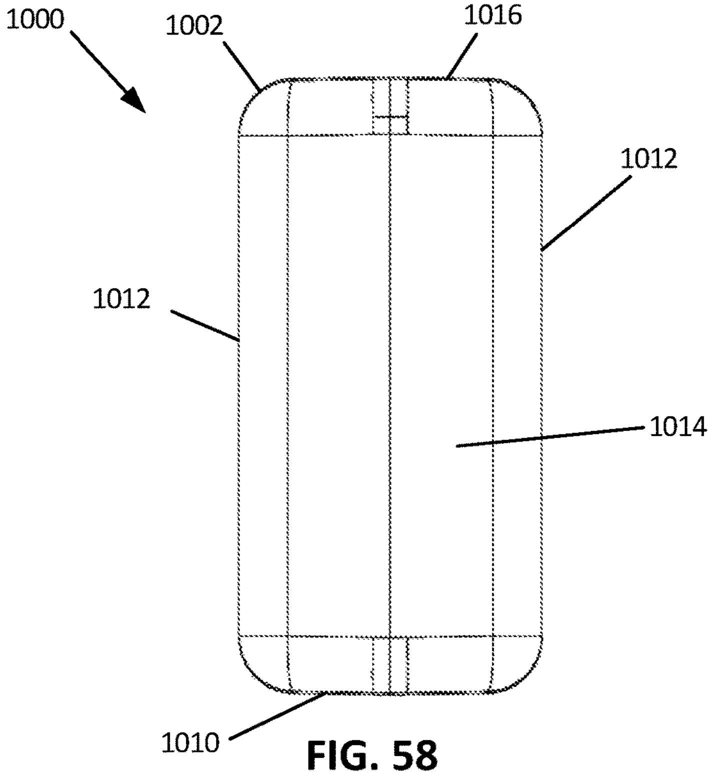
FIG. 58 illustrates a rear view of the sample container.
Figure 59:
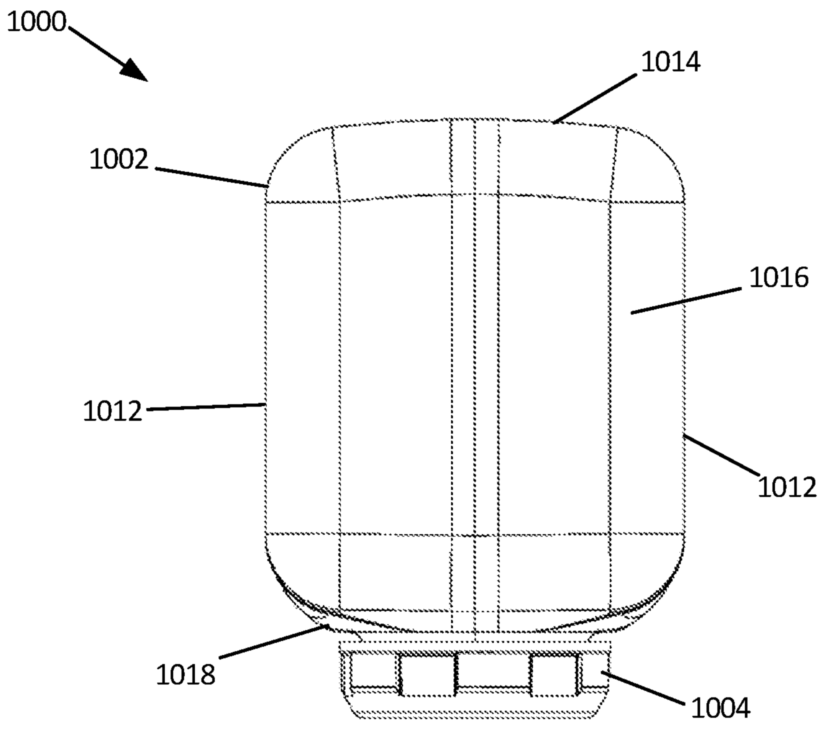
FIG. 59 illustrates a top view of the sample container.
Figure 60:
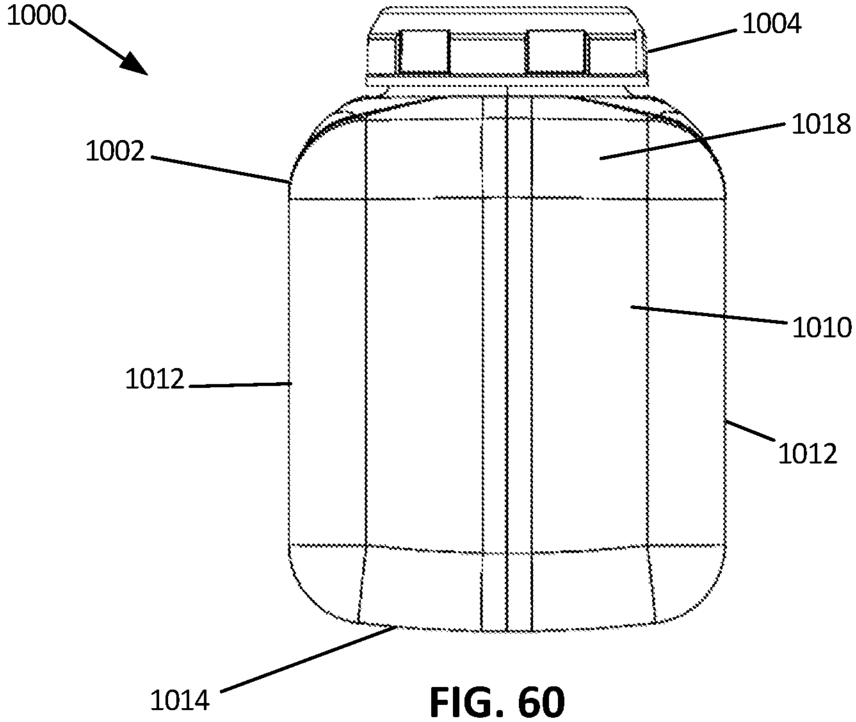
FIG. 60 illustrates a bottom view of the sample container.

Each sample container 1000 includes a cap 1004 that attaches to an opening 1008 for sealing the internal cavity 1006 of the container. As shown in FIG. 55, the opening 1008 is located on a front wall 1018 of each sample container 1000. The cap 1004 has internal threads that mate with external threads around the opening 1008. In this example, the cap 1004 can be turned in one direction (e.g., clockwise) to secure the cap 1004 to the opening 1008 and seal the internal cavity 1006, and the cap 1004 can be turned in an opposite direction (e.g., counterclockwise) to release the cap 1004 from the opening 1008 and provide access to the internal cavity 1006.

Figure 61:
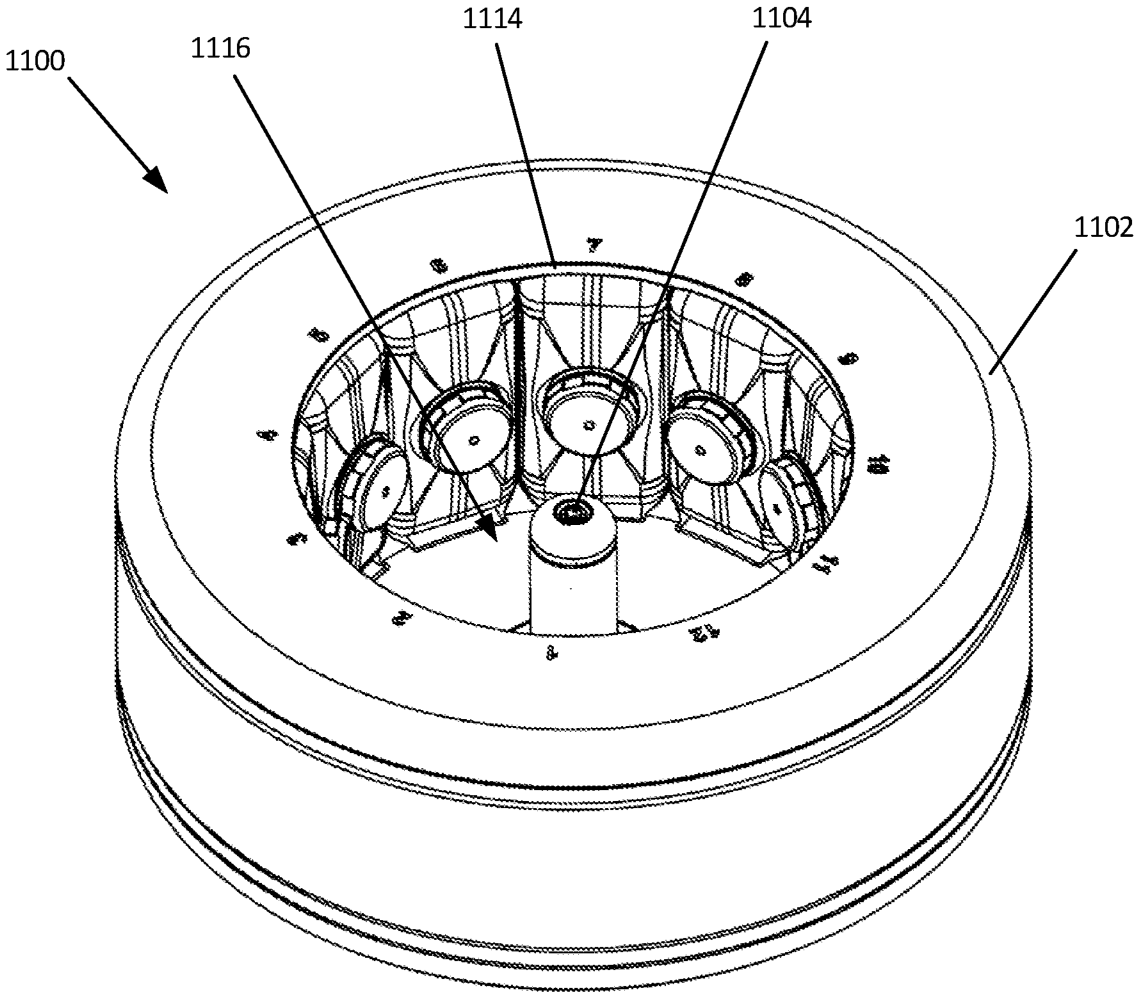
FIG. 61 illustrates a perspective view of another example rotor.

FIG. 61 illustrates a perspective view of another example rotor 1100. In this example, the rotor 1100 is substantially similar to the rotor 900 described with reference to FIGS. 44-53 and is configured to receive the sample containers 1000 described with reference to FIGS. 54-60. The rotor 1100 differs from the rotor 900 in that the rotor 1100 does not include a cover for sealing the opening 1114 of the annulus cavity 1116. Instead, the rotor 1100 includes a bullnose assembly 1104 that includes a bolt and washer to secure the rotor body 1102 to the drive shaft of the centrifuge motor. Thus, the rotor 1100 does not require attachment and removal of a cover each time the rotor 1100 is used.

The shape of the bullnose assembly 1104 improves the ergonomics of the rotor 1100 by covering the bolt and washer that secure the rotor 1100 to the drive shaft of the centrifuge motor. The bullnose assembly 1104 also provides a smooth surface for a user's hand to bump against when removing the sample containers 1000. The bullnose assembly 1104 also improves the distribution of the bolt load to the rotor body.

Figure 62:
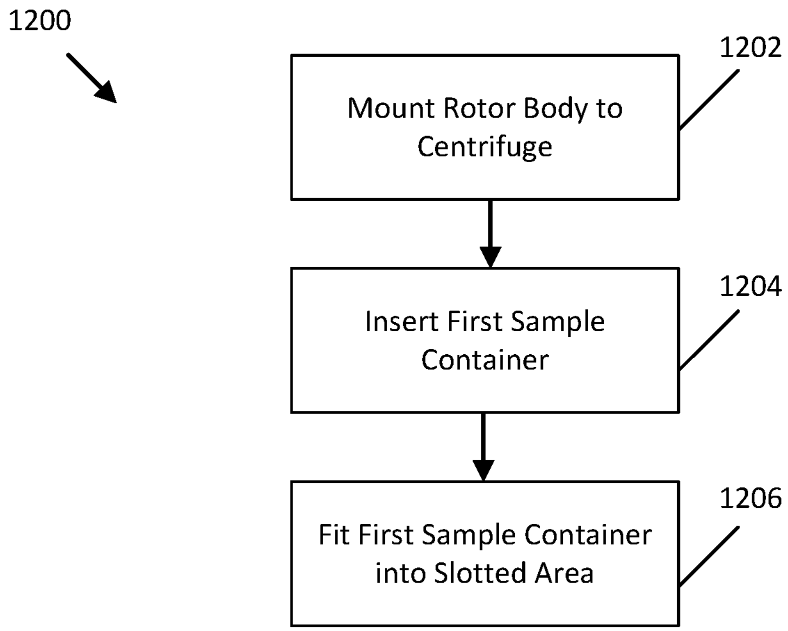
FIG. 62 illustrates a method of loading a centrifuge.

FIG. 62 illustrates a method 1200 of loading a centrifuge. The method 1200 includes a step 1202 of mounting a rotor body inside a centrifuge.

Next, the method 1200 includes a step 1204 of inserting a first sample container through an opening that provides access to an annulus cavity of a rotor body.

Thereafter, the method 1200 includes a step 1206 advancing radially the first sample container against a sidewall of the rotor body such that the first sample container is fitted into a slotted area defined between the sidewall, a first pair of adjacent supports, a base, and a top of the rotor body.

The method 1200 can further include inserting a second sample container through the opening that provides access to the annulus cavity of the rotor body, and advancing radially the second sample container against the sidewall of the rotor body such that the second sample container is fitted into another slotted area defined between the sidewall, a second pair adjacent supports, the base, and the top of the rotor body.

The rotor body includes a number of slotted areas between adjacent supports, and the method 1200 can include inserting a number of sample containers that is less than or equal to the number of slotted areas in the rotor body.

The method 1200 can include filling the sample containers with samples containing particles for separation before inserting the sample containers through the opening, and advancing radially the sample containers against the sidewall of the rotor body such that the sample containers are fitted into the slotted areas defined between the sidewall, adjacent supports, the base, and the top of the rotor body.

In some examples, the method 1200 further includes attaching a cover that seals the annulus cavity and secures the rotor body to a drive shaft of a centrifuge motor. In other examples, the method 1200 includes attaching a bullnose assembly that includes at least a bolt to secure the rotor body to the drive shaft of the centrifuge motor. After attaching the cover or bullnose assembly, the centrifuge can be operated to perform centrifugation of the samples contained within the sample containers in the rotor body.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A centrifuge rotor comprising:

a rotor body having a base, a sidewall, and a top, the top defining an opening that provides access to an annulus cavity inside the rotor body;

a drive hub extending from a portion of the base of the rotor body and configured to couple to a drive shaft of a centrifuge motor; and wherein the rotor body is configured to receive a first container in the annulus cavity, and to constrain the first container inside the annulus cavity between the base, the sidewall, and the top when the first container is advanced radially against the sidewall;

wherein the annulus cavity is shaped to constrain the first container and a second container, wherein the first container and the second container are different; and wherein a plurality of first containers and a plurality of second containers are shaped and positioned to form an annulus within the annulus cavity.

2. The centrifuge rotor of claim 1, wherein the annulus cavity defines an annulus cavity radius between the sidewall and a central axis of the rotor body and an opening radius between a peripheral edge of the opening and the central axis, and the opening radius is in a range from 40% to 70% of the annulus cavity radius.

3. The centrifuge rotor of claim 1, wherein the annulus cavity defines an annulus cavity radius between the sidewall and a central axis of the rotor body in a range from 8 inches to 10 inches, and an opening radius between a peripheral edge of the opening and the central axis in a range of 4 inches to 6 inches.

4. The centrifuge rotor of claim 1, wherein the annulus cavity is shaped to constrain an adapter between the first container and the second container.

5. The centrifuge rotor of claim 4, wherein a plurality of first containers, second containers, and adapters are shaped and positioned to form an annulus within the annulus cavity.

6. The centrifuge rotor of claim 1, wherein the annulus cavity is shaped for storing the plurality of first containers each having a volume in a range from 1 L to 2 L.

7. The centrifuge rotor of claim 1, further comprising a cover removably attachable to the rotor body to seal the annulus cavity.

8. The centrifuge rotor of claim 7, further comprising a tie-down bolt that removably attaches the cover and the rotor body to the drive shaft of the centrifuge motor.

9. A centrifuge rotor comprising:

a rotor body, including a sidewall;

an annulus cavity inside the rotor body;

a first container constrained inside the annulus cavity, the first container having a wedge shape and being constrained by at least the sidewall; and a second container constrained inside the annulus cavity, the second container having a substantially rectangular shape and being constrained by at least the sidewall.

10. The centrifuge rotor of claim 9, further comprising a cover for sealing the annulus cavity.

11. The centrifuge rotor of claim 9, further comprising a third container constrained inside the annulus cavity, the third container having a lopsided wedge shape and being constrained by at least the sidewall.

12. The centrifuge rotor of claim 9, further comprising a third container constrained inside the annulus cavity having a wedge angle, wherein the first container has a wedge angle, and the wedge angle of the third container is greater than the wedge angle of the first container.

13. The centrifuge rotor of claim 9, further comprising at least two third containers constrained inside the annulus cavity, wherein the second container is positioned between the third containers.

14. The centrifuge rotor of claim 9, further comprising an adapter constrained inside the annulus cavity between the first container and the second container, the adapter having a wedge shape.

15. The centrifuge rotor of claim 9, wherein the first container has a first surface adjacent to the sidewall, and a second surface facing a central axis of the rotor body, and the width of the first surface being larger than the width of the second surface.

16. The centrifuge rotor of claim 9, wherein the first container has a first surface adjacent to the sidewall, and a second surface facing a central axis of the rotor body, and the second surface is substantially flat.

17. The centrifuge rotor of claim 9, wherein the first container has side surfaces that are not parallel with one another, and a curved surface corresponding to a curved shape of the sidewall.

* * * * *